(12) United States Patent
Feng et al.

(10) Patent No.: US 7,924,718 B2
(45) Date of Patent: Apr. 12, 2011

(54) DISTRIBUTED JOINT ADMISSION CONTROL AND DYNAMIC RESOURCE ALLOCATION IN STREAM PROCESSING NETWORKS

(75) Inventors: Hanhua Feng, Baltimore, MD (US); Zhen Liu, Tarrytown, NY (US); Honghui Xia, Briarcliff Manor, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 12/535,805

(22) Filed: Aug. 5, 2009

(65) Prior Publication Data
US 2009/0300183 A1 Dec. 3, 2009

Related U.S. Application Data

(62) Division of application No. 11/758,706, filed on Jun. 6, 2007.

(51) Int. Cl.
*G01R 31/08* (2006.01)
(52) U.S. Cl. ......................................... 370/230; 370/468
(58) Field of Classification Search ........................ None
See application file for complete search history.

(56) References Cited

U.S. PATENT DOCUMENTS

| 7,414,978 B2 * | 8/2008 | Lun et al. ...................... 370/238 |
| 2006/0271544 A1 * | 11/2006 | Devarakonda et al. ........... 707/9 |
| 2008/0304516 A1 * | 12/2008 | Feng et al. .................... 370/468 |

OTHER PUBLICATIONS

Abadi, D.J., et al., "The Design of the Borealis Stream Processing Engine", Proceedings of the 2005 CIDR Conference, pp. 277-289.
Awerbuch, B, et al., "A Simple Local Control Approximation Algorithm for Multicommodity Flow", © 1993 IEEE, pp. 459-468.
Babcock, B., et al., "Chain: Operator Scheduling for Memory Minimization in Data Stream Systems", SIGMOD 2003, Jun. 9-12, 2003, San Diego, California, pp. 253-264.
Babcock, B., et al., "Load Shedding for Aggregation Queries over Data Streams", Proceedings of the 20th International Conference on Data Engineering, © IEEE, 12 pgs.
Broberg, J.A., et al., "A Multicommodity Flow Model for distributed Stream Processing", SIG Metrics/Performance '06, Jun. 26-30, 2006, St. Malo, France, pp. 377-378.

(Continued)

*Primary Examiner* — Robert W Wilson
(74) *Attorney, Agent, or Firm* — Harrington & Smith

(57) ABSTRACT

Methods and apparatus operating in a stream processing network perform load shedding and dynamic resource allocation so as to meet a pre-determined utility criterion. Load shedding is envisioned as an admission control problem encompassing source nodes admitting workflows into the stream processing network. A primal-dual approach is used to decompose the admission control and resource allocation problems. The admission control operates as a push-and-pull process with sources pushing workflows into the stream processing network and sinks pulling processed workflows from the network. A virtual queue is maintained at each node to account for both queue backlogs and credits from sinks. Nodes of the stream processing network maintain shadow prices for each of the workflows and share congestion information with neighbor nodes. At each node, resources are devoted to the workflow with the maximum product of downstream pressure and processing rate, where the downstream pressure is defined as the backlog difference between neighbor nodes. The primal-dual controller iteratively adjusts the admission rates and resource allocation using local congestion feedback. The iterative controlling procedure further uses an interior-point method to improve the speed of convergence towards optimal admission and allocation decisions.

2 Claims, 10 Drawing Sheets

OTHER PUBLICATIONS

Bui, L., et al., "Joint Asynchronous Congestion Control and Distributed Scheduling for Multi-Hop Wireless Networks", © 2006, IEEE, 12 pg.

Carney, D., et al., "Operator Scheduling in a Data Stream Manager", Proceedings of the 29$^{th}$ VLDB Conference, Berlin, Germany, 2003, 12 pgs.

Chandrasekaran, S., et al., "Remembrance of Streams Past: Overload-Sensitive Management of Archived Streams", Proceedings of the 30$^{th}$ VLDB Conference, Toronto, Canada 2004, pp. 348-359.

Chen, L., et al., "GATES: A grid-Based Middleware for Processing Distributed Data Streams", © 2004 IEEE, pp. 192-201.

Cherniack, M., et al., "Scalable Distributed Stream Processing", Procewedings of the 2003 CIDR Conference, 12 pgs.

Chi, Y., et al., "Loadstar: A Load Shedding Scheme for Classifying Data Streams", 12 pgs.

Cranor, C., et al., "Gigascope: A Stream Database for Network Applications", SIGMOD 2003, Jun. 9-12, 2003, San Diego, California, pp. 647-651.

Dai, J.G., et al., "Maximum Pressure Policies in Stochastic Processing Networks" Operations Research, vol. 53, No. 2, Mar.-Apr. 2005, pp. 197-218.

Gibbons, P.B., et al., "IrisNet: An Architecture for a Worldwide Sensor Web", © 2003 IEEE, 33 pgs.

Jain, N., et al., "Design, Implementation, and Evaluation of the Linear Road Benchmark on the Stream Processing Core", © 2006, pp. 431-442.

Kelly, F.P., et al., "Rate Control for Communication Networks: Shadow Prices, Proportional Fairness and Stability", University of Cambridge, UK, 16 pgs.

Lin, X., et al., "The Impact of Imperfect Scheduling on Cross-Layer Rate Control in Wireless Networks", © 2005, IEEE, pp. 1804-1814.

Motwani, R., et al., "Query Processing, Resource Management, and Approximation in a Data Stream Management System", Proceedings of the 2003 CIDR Conference, 12 pgs.

Pietzuch, P., et al., "Network-Aware Operator Placement for Steam-Processing Systems", © 2006 IEEE, 12 pgs.

Srivastava, U. et al., "Operator Placement for In-Network Stream Query Processing", PODS 2005, Jun. 13-15, 2006, Baltimore, Maryland, pp. 250-258.

Stolyar, A.L., "Maximizing Queing Network Utility Subject to Stability: Greedy Primal-Dual Algorithm", Queueing Systems 50, 2005, 56 pgs.

Tassiulas, L., et al., "Stability Properties of Constrained Queueing Systems and Scheduling Policies for Maximum Throughput in Multihop Radio Networks", © 1992 IEEE, pp. 1936-1948.

Tatbul, N., et al., "Load Shedding in a Data Stream Manager", Proceeding of the 29$^{th}$ VLDB Conference, Berlin, Germany, 2003, 12 pgs.

Tu, Y-C., et al., "Load Shedding in Stream Databases: A Control-Based Approach", VLDB '06, Sep. 12-15, 2006, Seoul, Korea, pp. 787-798.

Viglas, S. D., et al., "Rate-Based Query Optimization for Streaming Information Sources", ACM SIGMOD Jun. 4-6, 2002, Madison, Wisconsin, pp. 37-48.

Xiao, L., et al., "Simultaneous Routing and Resource Allocation Via Dual Decomposition", © 2004 IEEE, vol. 52, No. 7, Jul. 2004, pp. 1136-1144.

* cited by examiner

DISTRIBUTED JOINT ADMISSION CONTROL AND DYNAMIC RESOURCE ALLOCATION IN STREAM PROCESSING NETWORKS

CROSS REFERENCE

This patent application is a divisional application of U.S. application Ser. No. 11/758,706, filed Jun. 6, 2007, the disclosure of which is incorporated by reference in its entirety.

TECHNICAL FIELD

The invention generally concerns methods and apparatus for use in stream processing networks, and more particularly concerns distributed joint admission control and dynamic resource allocation in stream processing networks.

BACKGROUND

Recent advances in networking and information technology have boosted the development of new and advanced services offered over communication systems that integrate a widely heterogeneous mix of applications and computer devices. Without careful traffic control and resource management, the dramatic increase in demand for networking resources and remote application services may lead to substantial degradation of the Quality of Service ("QoS") as experienced by end users.

For example, as a result of rapid advances in computer technology and wireless communications, a new set of streaming applications flourish in a number of fields such as financial analysis, system diagnosis, environmental monitoring, and mobile services. These applications typically involve filtering, aggregation and processing of high-volume, real-time and continuous data across a large number of interconnected devices. Distributed data management has emerged as an appealing solution in response to these applications. In recent years, a number of distributed Data Stream Management Systems (DSMSs) have been developed, see, for example, Borealis [1], Medusa [11], GATES [10], IrisNet [15] and SPC [16].

Most queries in these DSMSs are persistent queries that continuously output results as they are produced. The rates at which data arrives can be bursty and unpredictable. Consider, for example, a disaster sense and respond system that monitors and detects certain disaster events. When the events happen, the data rates can dramatically increase and it is important that relevant data be delivered and processed in a timely fashion. In this example, the relative importance of output data can be used for QoS specification. Such QoS can be measured in throughput, delay or general utility functions of these metrics. Different users/applications may specify the QoS requirements differently and must always try to maximize the total delivered QoS [1]. With the unpredictable and bursty nature of the arrival process, the admission rates can create a load that exceeds the system capacity during times of stress. Even when the system is not stressed, in the absence of any type of control, the initiation of the various streams is likely to cause congestion and collisions as they traverse interfering paths from the plurality of sources to the sinks. The system must therefore employ effective load shedding and resource control mechanisms so as to optimize the operating environment. In general terms, load-shedding is the process of admission control where excess load is dropped so that input streams can be processed within QoS requirements. Inside the stream processing system, the resources that require intelligent management and control include storage, processor cycles and communication bandwidth.

Accordingly, the need for improved stream processing methods and apparatus is becoming increasingly apparent with the proliferation of applications that require sophisticated processing of data generated or stored by large numbers of distributed sources (such as data streams generated from sensor networks, financial feeds, traffic monitoring center or other real-time enterprises). In such applications, continuous flows of data are brought into the stream processing environment in the form of streams. Various processing units are instantiated to analyze the data—potentially annotating the data, transforming the data, or synthesizing new data for further processing, and publishing the data to output streams or storage. Such processing/analyses are required to be performed on the fly, often with little or low tolerance for delay, in order to enable real-time responses. The requirements to process, store, maintain and retrieve large volumes of mostly real-time (continuous/streaming) data at a high rate, pose great design challenges for efficient stream processing systems.

Resource allocation problems encountered in stream processing systems have been considered heretofore without satisfactory resolution. Multiple data streams flow into the stream processing system to be processed and eventually to lead to valuable output. Examples of such processing include matching, aggregation, summarization, etc. Each stream requires certain amount of resource from the nodes to be processed. The nodes need to decide how much flow to admit into the system. The overall objective is to maximize a system utility function, which is a concave function of the amount of processed flow rates.

As the physical network can be large and distributed, it is difficult and unrealistic to look for a centralized solution. As stream processing systems grow larger in size, applications are often running in a decentralized, distributed environment. At any given time, no one entity has global information about all of the nodes in the system. The actions of one node may inadvertently degrade the performance of the overall system, even if the nodes greedily optimize their performance. It is thus difficult to determine the best control mechanism at each node in isolation, so that the overall system performance is optimized. In addition, the system must adapt to dynamic changes in network conditions as well as input and resource consumption fluctuations. The system needs to coordinate processing, communication, storage/buffering, and the input/output of neighboring nodes to meet these challenging requirements. Dynamically choosing when, where and how much load to shed and coordinating the resource allocation accordingly is therefore a challenging problem.

As a result, those skilled in the art seek improved methods and apparatus for controlling stream processing networks. In particular, those skilled in the art seek methods and apparatus that overcome the limitations of current centralized stream processing control methods. For example, those skilled in the art seek methods and apparatus for controlling load shedding and resource allocation in stream processing networks that can operate without centralized control. It is not enough merely to control load shedding and resource allocation in other than a centralized manner. Those skilled in the art seek methods and apparatus that achieve near-optimal or optimal load shedding and resource allocation decisions with reasonable convergence behavior.

SUMMARY OF THE INVENTION

A first embodiment of the invention is a method for use in a stream processing network. In the method, workflow admission decisions are separated from processing and communication resource allocation decisions in a stream processing network operating on a plurality of workflows using a primal-dual approach. Once separated, workflow admission decisions in the stream processing network and workflow processing and communication resource allocation decisions in the stream processing network are made in a distributed manner. In the method, the distributed workflow admission decisions and distributed workflow processing and communication resource allocation decisions are made in such a manner so as to meet a pre-determined utility criterion.

A second embodiment of the invention is a stream processing network comprising: a plurality of source nodes configured to admit a plurality of workflows into the stream processing network; a plurality of sink nodes configured to release processed workflows from the stream processing network; a plurality of processing nodes, each of the processing nodes comprising a processing resource configured to perform processing operations on at least one workflow; a plurality of communication links connecting the sources, sinks and processing nodes, each of the communication links comprising a communications resource; workflow admission apparatus operative at each of the plurality of source nodes, the workflow admission apparatus configured to make workflow admission decisions; and resource allocation apparatus operative at each of the processing nodes, each resource allocation apparatus configured to share congestion information with resource allocation apparatus operative at neighboring processing nodes; and to allocate the processing resources associated with processing nodes and communications resources associated with communications links between workflows in dependence on the shared congestion information; wherein the workflow admission apparatus operative at each of the plurality of source nodes and resource allocation apparatus operative at each of the processing nodes implement a primal-dual controller that iteratively controls workflow admission decisions and resource allocation decisions in a distributed manner through operations performed by the workflow admission apparatus and the resource allocation apparatus.

In a variant of the second embodiment, the iterative controlling procedure further uses an interior-point method to improve the speed of convergence towards optimal admission and allocation decisions. The interior-point method further comprises inflating the utility criteria by adding barrier functions so as to penalize exhaustive resource usage, and at each iteration at a particular processing node calculating anticipated profitability for processing a particular workflow; a profit margin associated with processing the particular workflow; and a cost of processing the particular workflow; and sharing the anticipated profitability; profit margin and cost with neighboring nodes as workflow-related information.

A third embodiment of the invention is a processing node configured to operate in a stream processing network, the processing node comprising: communication links configured to be coupled to the stream processing network and to communicate with other elements of the stream processing network; at least one memory configured to store at least one computer program, the computer program configured to perform distributed processing and communication resource allocation control as part of a primal dual controller implemented in the stream processing network, the at least one memory further configured to store workflow and workflow-related information; and at least one processing apparatus coupled to the communication links and the at least one memory, the processing apparatus configured to execute the at least one computer program and to perform processing operations on workflows received by the processing node, wherein when the at least one program is executed the processing node is configured to receive workflows presented for processing purposes; to maintain a queue for each workflow presented for processing purposes; to generate workflow-related information concerning the queue for each workflow; to transmit the workflow-related information to local elements of the stream processing network; to receive workflow-related information from the local elements of the stream processing network; and to allocate processing capacity of the processing node to at least one workflow in dependence on the workflow-related information generated by the processing node and received from local elements of the stream processing network A fourth embodiment of the invention is a computer program product tangibly embodying a computer program in a machine-readable memory medium, the computer program configured to control operations of a processing node in a stream processing network when executed by digital processing apparatus, the operations comprising: receiving workflows presented for processing purposes; maintaining a queue for each workflow presented for processing purposes; generating workflow-related information concerning the queue for each workflow; transmitting the workflow-related information to local elements of the stream processing network; receiving workflow-related information from the local elements of the stream processing network; and allocating processing capacity of the processing node to at least one work flow in dependence on the workflow-related information generated by the processing node and received from local elements of the stream processing network.

In conclusion, the foregoing summary of the various embodiments of the present invention is exemplary and non-limiting. For example, one or ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Invention, when read in conjunction with the attached Drawing Figures, wherein.

DETAILED DESCRIPTION OF THE INVENTION

Figure 1:
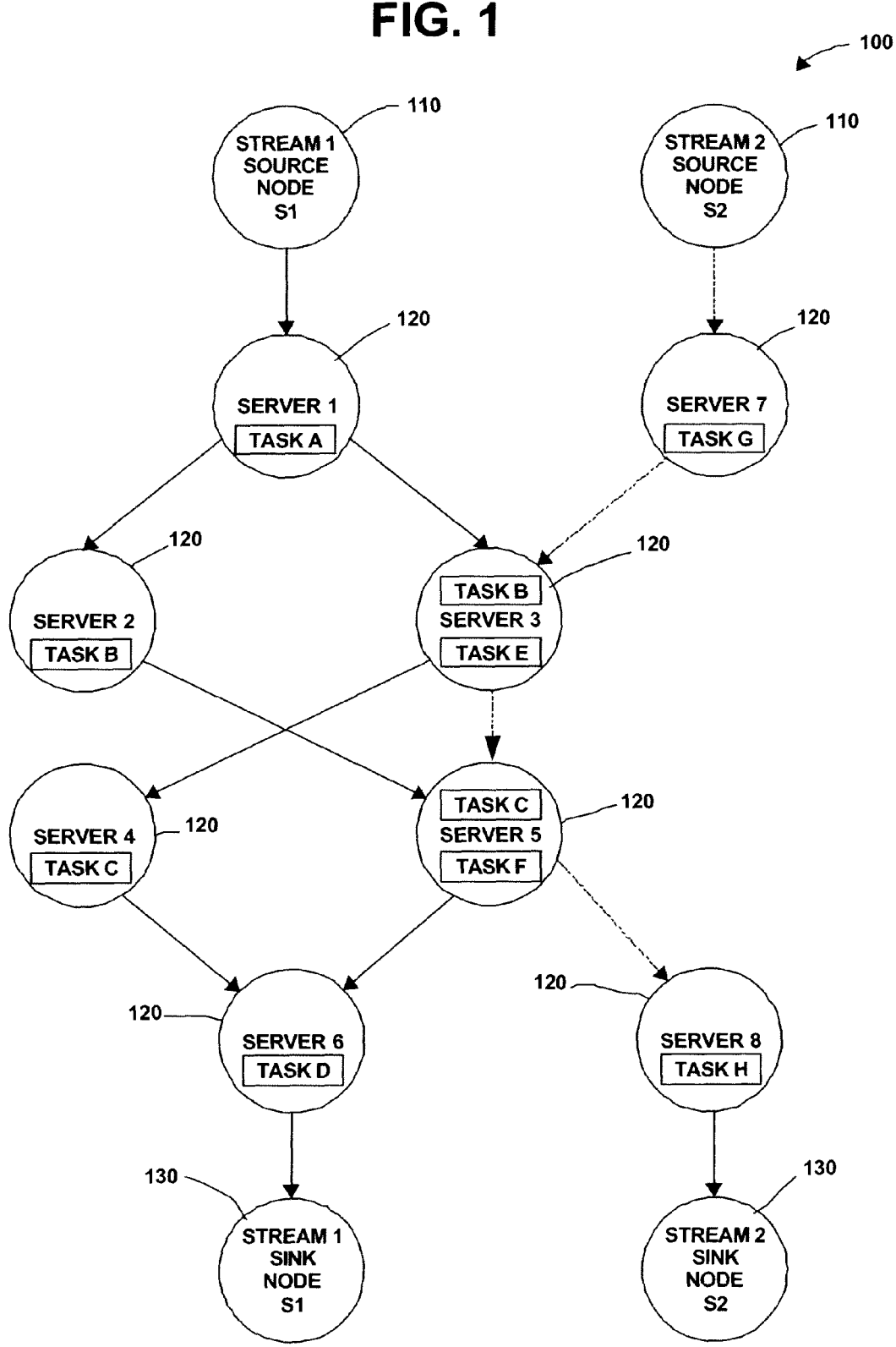
FIG. 1 is a block diagram depicting a stream processing network in which aspects of the invention may be practiced.

The invention concerns methods and apparatus that implement efficient mechanisms for joint load shedding and distributed resource control of a generic stream processing system. It is typical in such a system that a large number of data sources are continuously pumping high-volume and possibly bursty data streams into the system. The system consists of a network of cooperating servers, collectively providing processing services for the multiple data streams. It is assumed that all servers have finite computing resources and all communication links have finite available bandwidth. Each stream is required to complete a series of operations on various servers before reaching the corresponding sink. The stream data rate may change after each operation. For example, a filtering operation may shrink the stream size, while a decryption operation may expand the stream size. In one aspect a flow network operating in accordance with the invention differs from a conventional flow network since flow conservation, in the classical sense, no longer holds. It is assumed that the QoS of a stream is captured by an increasing concave utility function of the stream goodput rate. In one aspect of the invention, methods and apparatus of the invention implement distributed load-shedding and resource control mechanisms that meet a pre-determined utility criterion—such as, for example, one that maximizes the total utility of all concurrent streams.

The problem is formulated as a general utility optimization problem with resource constraints. In one aspect of the invention, computing and bandwidth resources are unified with an extended graph representation. The original problem is then mapped into an equivalent problem, where the shrinkage effects are absorbed into system parameters. In another aspect of the invention, a duality approach is used to decompose the load shedding problem and the resource allocation problem.

The invention can then be implemented as an efficient distributed algorithm that converges to the optimal solution.

In one embodiment, the invention is implemented as a distributed algorithm based on a primal-dual controller which iteratively adjusts the admission rates and resource allocations using local congestion feedback. In this embodiment, the invention incorporates a pressure-based $c\mu$-rule for resource allocation, and a push-and-pull mechanism for load shedding. At each node, computing resources are devoted to the commodity with the maximum downstream pressure times processing rate, where the pressure is defined as the backlog difference of neighboring nodes. For load shedding, in addition to having sources push flows into the network, in an embodiment of the invention sinks also pull flows simultaneously from the other side. A virtual queue is maintained at each node to account for both queuing backlogs (originating from sources) and credits (from sinks). The virtual queue backlogs at the sources, in combination with the utility function, are then used to determine the optimal admission rate. It can be shown that a distributed algorithm operating in accordance with the invention results in a stable stream processing network and converges to an optimal solution. Methods and apparatus operating in accordance with this embodiment of the invention converge much faster than the conventional methods, while maintaining a relatively low level of queue sizes inside the system.

Before proceeding with a more detailed description of embodiments of the invention, a description of the prior art will be provided. There have been a number of efforts focusing on the design of data stream management systems [1, 11, 10, 15, 16], query optimization [28, 23], and operator scheduling [3]. Much less attention has been paid to load shedding and resource management. Existing work on load shedding for data stream management systems are mostly based on simple heuristics, or statistical models, e.g. [26, 4, 27, 9, 20]. A review of the art indicates that the joint problem of dynamic load shedding and distributed resource control that maximizes overall system utility has not yet been fully studied.

In the context of radio networks where the incoming flows are inelastic, [25] first addressed the joint routing and scheduling problem, where they showed that a queue-length-based scheduling policy guarantees stability of the buffers as long as the arrival rates lie within the capacity region of the network. In the context of wireline networks, the idea of a distributed flow control based on a system-wide optimization problem was developed in [17], and followed by many others, see [22] for a survey. More recently, the approach has been adapted to address the problem of serving elastic traffic over wireless newtorks [19, 7], where rate control algorithms are introduced that adapt the flow rates as a function of the entry queue length. In [19], a dual congestion controller is used assuming flow rate can be adjusted instantaneously in response to congestion feedback in the network. In the context of stochastic queueing networks, [24] and [14] showed that similar queue-length-based control policies can achieve the system stability or maximum network utility under fluid or diffusion scaling.

The invention differs from these efforts in multiple aspects. First, the multicommodity model [5] is generalized to the stream processing setting so as to allow flow shrinkage and expansion. Multicommodity flow problems have been studied extensively in the context of conventional flow networks. Readers are referred to [5, 2] for the solution techniques and the related literature. Traditional multicommodity flow networks require flow conservation, which no longer holds with flow shrinkage/expansion.

Second, the invention addresses different problems with a different system to be controlled. The traditional wired/wireless network optimization formulation often assumes constraints on link-level capacities. In one problem solved by the invention, in addition to link bandwidth constraints, there are processing power constraints for each server. In one aspect of the invention, an extended graph representation of the problem is presented that unifies the two different types of resources and the resulting network only has resource constraints on the nodes. The resource constraints at the node level leads to very different local control mechanisms. In an embodiment of the invention, resource allocation policy is implemented as a max pressure-based c μ-rule which takes into account not only upstream and downstream congestion backlog, but also the heterogeneous resource costs associated with different streams.

In further aspects of the invention, in addition to a primal-dual congestion controller, push-and-pull admission techniques are used to speed up convergence of the distributed algorithm while maintaining a low content level in the queues.

Stream Processing Network Model: Consider a distributed stream processing system consisting of a network of cooperating servers. The underlying network is modeled as a capacitated directed graph $G_0 = (\mathcal{N}_0, \epsilon_0)$ where $\mathcal{N}_0$ denotes the set of processing nodes, sensors (data sources), and sinks, and $\epsilon_0$ denotes the connectivity between the various nodes. Associated with each node is a processing constraint, $R_u$, $u \in \mathcal{N}_0$ and with each link a communication bandwidth $B_{u,v}$ (u, v), $\in \epsilon_0$. Graph $G_0$ can be arbitrary.

Commodities: Corresponding to the multiple concurrent applications or services supported by the system, the system needs to process various streams and to produce multiple types of eventual information or products for different end-users. These different types of eventual processed information are referred to as commodities. It is assumed that there are K different types of commodities, indexed by $k \in \mathcal{K}$, with $|\mathcal{K}| = K$. Each commodity k is associated with a unique source node $s_k$ and a unique sink node $d_k$. It is further assumed that source $s_k$ generates data at a finite rate $\lambda_k$.

Commodity streams are processed independently of each other, except for possibly sharing some common computing/communication resources. The processing of a commodity stream consists of a series of (feed-forward) tasks. A task may be assigned to multiple servers, and tasks belonging to different commodity streams may be assigned to the same server. The placement of various tasks onto the physical network itself is an interesting problem. There have been studies on how to place various tasks onto the physical network. Readers are referred to [23, 21] for related techniques. Here, it is assumed that the task to server assignment is given. For simplicity, a server is assigned to process at most one task for each commodity.

Based on the task to server assignment, the tasks of each commodity stream form a directed acyclic graph (DAG), $G_k = (\mathcal{N}_k, \epsilon_k)$ where $\mathcal{N}_k \subset \mathcal{N}_0$ and $\epsilon_k \subset \epsilon_0$, $k \in \mathcal{K}$.

Generic Graph Representation: The problem can now be represented using a generic (directed) graph $G = (\mathcal{N}, \epsilon)$ where $G_k = \cup_{k \in \mathcal{K}} G_k$. Here $\mathcal{N} \subset \mathcal{N}_0$, which consists of sources, sinks and processing nodes, and $\epsilon \subset \epsilon_0$. An edge (u, v)$\in \epsilon$ for server u indicates that a task resides on node v that can handle data output from node u for some commodity. Graph G is assumed to be connected. Note that G itself may not be acyclic, however, the subgraphs corresponding to individual streams are DAGs.

Consider, for example, a stream processing network 100 as depicted in FIG. 1 comprised of sources 110, processing nodes 120 and sinks 130. Stream 1 requires the sequential processing of Tasks A, B, C, and D, and stream 2 requires the sequence of Tasks G, E, F, and H. Suppose the tasks are assigned such that $\mathcal{T}_1 = \{A\}$, $\mathcal{T}_2 = \{B\}$, $\mathcal{T}_3 = \{B,E\}$, $\mathcal{T}_4 = \{C\}$, $\mathcal{T}_5 = \{C,F\}$, $\mathcal{T}_6 = \{D\}$, $\mathcal{T}_7 = \{G\}$, $\mathcal{T}_8 = \{H\}$, where $\mathcal{T}_u$ denotes the set of tasks that are assigned to server u. Then the directed acyclic sub-graph of the physical network is shown in FIG. 1, where the sub-graph composed of solid links corresponds to stream S1 and the sub-graph composed of dashed links corresponds to stream S2.

Figure 2:
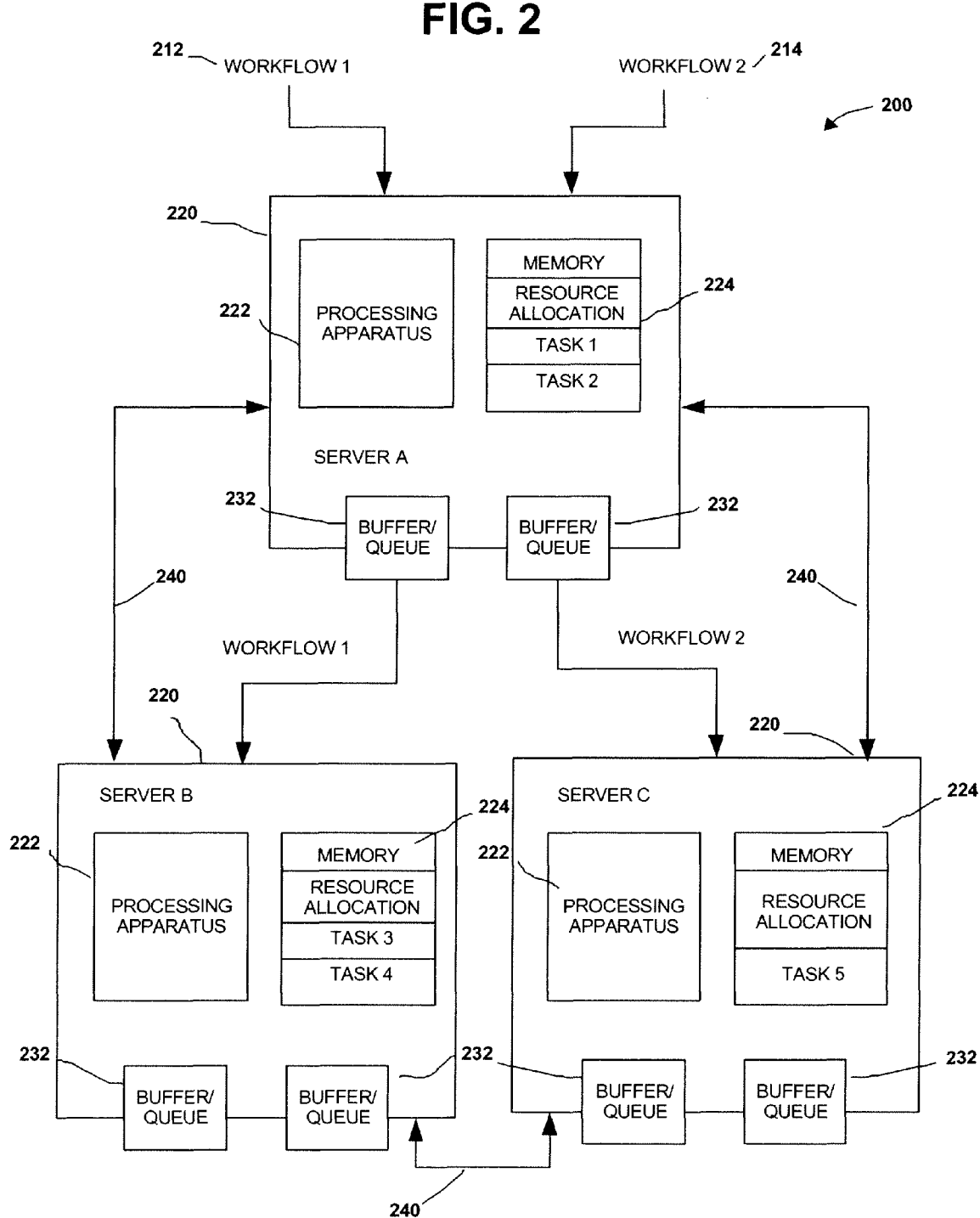
FIG. 2 is another block diagram depicting a stream processing network in which aspects of the invention may be practiced.

Another example of an environment in which methods of the invention may be practiced is depicted in FIG. 2. FIG. 2 depicts a portion 200 of a stream processing network comprised of three servers 220: server A, server B and server C. Each server comprises communication links (shown by the arrows), processing apparatus 222, memory 224 and buffers/queues 232. The memory 224 of each server 220 stores at least two programs—a first program to perform resource allocation in accordance with the invention and at least a second program to perform a processing task on a workflow. For example, the memory 224 of server A stores a program to perform resource allocation; a program to perform processing task 1 on a workflow and a program to perform processing task 2 on a workflow. The memory 224 of server B stores a resource allocation program, a program to perform a processing task 3 on a workflow and a program to perform a processing task 4 on a workflow. The memory 224 of server C stores a resource allocation program and a program, to perform a processing task 5 on a workflow. The resource allocation programs are configured to implement processing resource and communication resource allocation in accordance with the invention. The servers 220 are also configured to share workflow related information with each other over communication links 240 to aid in making processing and communication resource allocations.

It is assumed that it takes computing power $r_{u,v}^k$ for node u to process one unit of commodity k flow for downstream node v with (u, v)$\in \epsilon$. Each unit of commodity k input produces $\beta_{u,v}^k$ (>0) units of output after processing. This parameter $\beta$ only depends on the task being executed for its corresponding stream. The parameter $\beta_{uv}^k$ shall be referred to as a shrinkage factor, which represents the shrinkage (if<1) or expansion (if>1) effect in stream processing. Thus flow conservation may not hold in the processing stage.

Utility Function: A goal is to design a joint load shedding (at the sources), data routing, and resource allocation mechanism such that the overall information delivered by the stream processing system is maximized. Data is distinguished from information in the following sense. Let $x_k$ denote the admission rate of commodity k flow at source $s_k$, k=1, . . . , K, and denote x:=$\{x_k, k \in \mathcal{K}\}$ the vector of admission rates at all sources. A utility function $U_k(x_k)$ quantifies the value of this data to the data-consuming applications. It is assumed that $U_k$ is twice differentiable, strictly concave, nondecreasing, reflecting the diminishing marginal returns of receiving more data. It is desirable to maximize the overall system utility $U(x) = \Sigma_k U_k(x_k)$.

Since the system is constrained in both computing power and communication bandwidth, each server is faced with two decisions: first, it has to allocate its computing power to multiple processing tasks; second, it has to share the bandwidth on each output link among the multiple flows going through it. A source node has the extra duty for load shedding so that the system stays stable and the overall system utility is maximized.

Problem Formulation: The following utility optimization problem results:

Given: network G=(N, S), resource budget R, resource consumption rate r, shrinkage factor β, and maximum data input rate λ.

Maximize: Overall system utility $U(x)=\Sigma_k U_k(x_k)$.

Constraints:
1) Per node resource constraint;
2) Per link bandwidth constraint;
3) Generalized flow balance constraints that account for shrinkage factors;
4) $0 \leq x_k \leq \lambda_k$, $\forall k \in \mathcal{K}$.

The generalized flow balance constraints ensure that incoming flows arrive at the same rate as outgoing flows being consumed (so as to be processed) at each node for each commodity. Note that due to the shrinkage and expansion effects, for one unit of commodity k flow on node u heading towards node v, after processing, it becomes $\beta_{uv}^k$ units of actual outgoing flow to downstream node v.

The problem presented above requires the optimal allocation of two different resources (computing power per node and communication bandwidth per link). Moreover, it requires load shedding at sources since the optimal injection rate $x_k$ is not known until one solves the optimization problem. In this section, ways are presented to unify the two different resources and also to transform the joint resource allocation and load shedding problem into a tangible routing problem.

Figure 3:
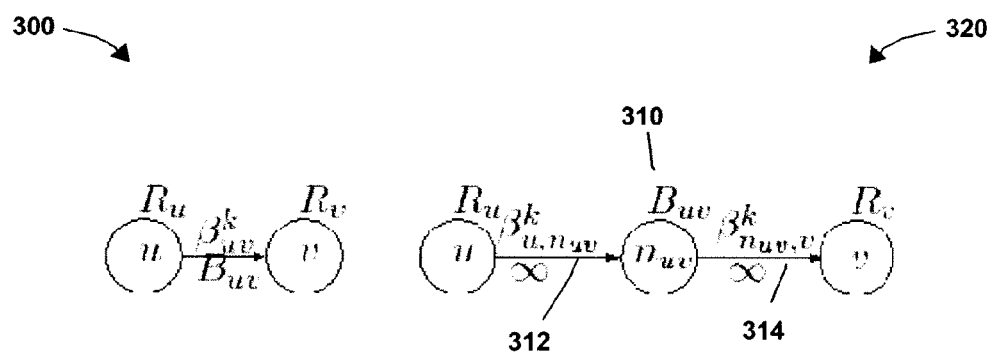
FIG. 3 is a graph depicting how a communications link may be represented as a node in a derivative graph in accordance with an aspect of the invention.

Bandwidth Node: Next a scheme is presented to extend the original graph so that two different resources (computing power and link bandwidth) can be addressed in a unified way. This is done by introducing a bandwidth node 310, denoted as $n_{uv}$, for each edge $(u, v) \in \epsilon$. Bandwidth node 310 is depicted in modified graph 320 derived from original graph 300. Directed edges $(u, n_{uv})$ 312 and $(n_{uv}, v)$ 314 are also added in modified graph 320 (see FIG. 3). It is assumed that bandwidth node $n_{uv}$ 310 has a total resource $R_{n_{uv}} = B_{uv}$. The role of a bandwidth node is to transfer flows. It requires one unit of its resource (bandwidth) to transfer one unit of flow, which becomes one unit of flow for the downstream node. In other words, $\beta_{n_{uv},v}^k=1$, $r_{n_{uv},v}^k=1$. In addition, set $r_{u,n_{uv}}^k = r_{uv}^k$, $\beta_{u,n_{uv}}^k = \beta_{uv}^k$.

With the addition of the bandwidth nodes (and corresponding links), in one aspect of the invention the original problem of allocating two different resources is transformed into a unified resource allocation problem with a single resource constraint on each node. If a node is a bandwidth node, then it is constrained by bandwidth; if it is a processing node, then it is constrained by the computing resource. The new system is then faced with a unified problem: finding efficient ways of shipping all K commodity flows to their respective destinations subject to the (node) resource constraints at each node.

The resulting new graph is denoted by G=(V, L), where V denotes the extended node set (including the bandwidth nodes) and $\mathcal{L}$ the extended edge set. Last, for node u, let $L_1(u)$ denote the set of links that terminates at it, $L_O(u)$ the set of links that emanates from it, and $L(u)=L_1(u) \cup L_O(u)$ the set of links adjacent to node u.

Clearly, after the above transformation, an original graph G with N nodes, M edges and K commodities produces a new graph G with N+M nodes, 2M edges and K commodities.

Shrinkage Effect: It is possible for flows of the same commodity to travel along different paths to reach the sink. Resource consumption may also vary along the different paths. Since the shrinkage factor depends only on the tasks being executed, and the task graph is fixed for each commodity, the ending shrinkage effect does not depend on the processing path. This leads to the following property on β:

Property 1 For each commodity k, any two distinct paths $p=(u_0, u_1, \ldots, u_n)$, $p'=(u_0', u_1', \ldots, u_n')$ that share the same starting and ending points, i.e. $u_0=u_0'$ and $u_n=u_n'$, must satisfy $$\prod_{j=0}^{n-1} \beta_{u_j,u_{j+1}}^k = \prod_{j=0}^{n'-1} \beta_{u_j',u_{j+1}'}^k$$

Denote $g_k(u)$ the product of the $\beta_{uv}^k$'s along any feasible path from source $s_k$ to node u for commodity k. Set $g_k(s_k)=1$, and denote $g_k = g_k(d_k)$. Property 1 implies that, no matter which path it takes, the successful delivery of one unit of commodity k from source $s_k$ to node u results in $g_k(u)$ amount of output at node u. In other words, a unit flow of commodity k at node u corresponds to $1/g_k(u)$ units of flow viewed by source $s_k$. The shrinkage effect can be absorbed by counting the units of commodity k flow from the viewpoint of source node $s_k$ for all $k \in \mathcal{K}$. A unit (in the view of the source node $s_k$) of commodity k flow at node u now takes computing power $\bar{r}_{uv}^k = r_{uv}^k g_k(u)$ to be processed over link $(u, v) \in \epsilon$ and it is still a unit flow (in the view of the source node $s_k$) at downstream node v. Thus the conservation law still holds, and the resource consumption parameters are simply updated to $\{\bar{r}_{uv}^k\}$ for all $k \in \mathcal{K}$ and $(u, v) \in \epsilon$.

The new graph $\mathcal{G}=(\mathcal{V}, \mathcal{L})$ is used in the remaining analysis with a resource budget $\mathcal{C}$, maximum data input rate λ, new resource consumption rate $\bar{r}$, in which all flow rates are defined in the view of the corresponding source nodes.

Problem Formulation: With the above transformation, the following utility optimization problem results on the new graph $\mathcal{G}$. Denote by $y_{uv}^k$ the amount of commodity k to be processed per unit time on node u for downstream node v. Then the vector $y=\{u_{uv}^k: (u, v) \in \mathcal{L}, k \in \mathcal{K}\}$ specifies the resource allocation scheme at each node. The problem is to find jointly a vector of resource allocation decisions $y=[y_{uv}^k]_{(u,v) \in \mathcal{L}, k \in \mathcal{K}}$ and a vector of rates (for admission control) $x=[x_k]_{k \in \mathcal{K}}$ such that $$(P) \max \sum_{k \in \mathcal{K}} U_k(x_k) \qquad (1)$$

$$\text{s.t.} \sum_{v \in L_I(u)} y_{vu}^k - \sum_{v \in L_O(u)} y_{uv}^k + x_k(1_{u=s_k} - 1_{u=d_k}) = 0,$$

$$\forall k \in \mathcal{K}, \forall u \in \mathcal{V}$$

$$\sum_{v \in L_O(u)} \sum_{k \in \mathcal{K}} y_{uv}^k \bar{r}_{uv}^k \leq R_u, \qquad (2)$$

$$\forall u \in V$$

$$y_{uv}^k \geq 0, \forall (u, v) \in \mathcal{L}, \forall k \in \mathcal{K} \qquad (3)$$

$$0 \leq x_k \leq \lambda_k, \forall k \in \mathcal{K} \qquad (4)$$

where $1_{a=b}$ is an indicator which equals 1 if a=b and 0 otherwise. Conditions (3)-(4) require the variables to be non-negative. Condition (2) represents the resource constraint on each node. Condition (1) represents the flow balance requirements such that incoming flows arrive at the same rate as outgoing flows being consumed at each node for each commodity. The above problem is referred to as the primal problem.

In this section, using a duality approach, it is show that the resource allocation problem and the load shedding problem can be decomposed, which enables the design of distributed algorithms that converge to the optimal solution in accordance with embodiments of the invention.

Denote $X=\{x:0\leq x_k \leq \lambda_k, \forall k \in \mathcal{K}\}$, and $Y=\{: \text{satisfy constraints}-\}$. For each constraint in (1), introduce a Lagrangian multiplier $q_u^k$ (unrestricted in its sign), and denote $q=[q_u^k]_{u \in V, k \in \mathcal{K}}$. The Lagrangian is then written $$L(x, y, q) = \sum_{k \in \mathcal{K}} U_k(x_k) + \sum_{k \in \mathcal{K}} \sum_{u \in V} q_u^k \left[ \begin{array}{c} \sum_{v \in L_I(u)} y_{vu}^k - \\ \sum_{v \in L_O(u)} y_{uv}^k + x_k \left( \begin{array}{c} 1_{u=s_k} - \\ 1_{u=d_k} \end{array} \right) \end{array} \right]$$

$$= \sum_{k \in \mathcal{K}} [U_k(x_k) - x_k(q_{s_k}^k - q_{d_k}^k)] + \sum_{k \in \mathcal{K}} \sum_{(u,v) \in \mathcal{L}} y_{uv}^k(q_u^k - q_v^k),$$

subject to $x \in X$ and $y \in Y$. The Lagrangian dual problem is then $$(D) \min_q D(q). \tag{5}$$

where $$D(q) = \max_{x \in X, y \in Y} L(x, y, q) = \sum_{k \in \mathcal{K}} \Theta_k(q) + \sum_{u \in V} \Phi_u(q),$$

$$\Theta_k(q) = \max_{0 \leq x_k \leq \lambda_k} [U_k(x_k) - x_k(q_s^k - q_d^k)], \tag{6}$$

and $$\Phi_u(q) = \max_{y_u \in Y_u} \sum_{v \in L_O(u)} \sum_{k \in \mathcal{K}} y_{uv}^k(q_u^k - q_v^k), \tag{7}$$

with $$Y_u = \left\{ [y_{u,v}^k]_{v \in L_O(u), k \in \mathcal{K}} \geq 0 : \sum_{v \in L_O(u)} \sum_{k \in \mathcal{K}} y_{uv}^k \tilde{r}_{uv}^k \leq R_u \right\}.$$

The dual problem thus leads to an elegant decomposition of the joint optimization problem (P). Given q, the problem has been decomposed into an admission control problem (6) and a resource allocation problem (7).

Here $q_u^k$ can be interpreted as a price given by node u for processing a unit amount of data of commodity k. Each node u tries to maximize its own profit, i.e. the sum of earning rates from all commodities. The earning rates from commodity k is the amount of flow processed per unit time, times the amount of earnings per unit flow, which is the price difference between what it receives from the upstream nodes, and what it pays the downstream nodes. The price difference on edge (u, v) for commodity k is called the pressure of commodity k on edge (u, v).

The function $\Theta_k(q)$ is the profit collected by the (admission) rate controller of commodity k, which is the utility value (i.e. what it receives from the customer) minus the amount paid to the nodes on the processing path. As indicated by (6), the quantity $q_s^k - q_d^k$ is simply the price of transferring a unit amount of data of commodity k from the source $s_k$ to its destination $d_k$.

With a given price scheme q, the optimal (admission) rate can be obtained by solving (6), which yields:

$$x^*{}_{uv}^k = [(U_k')^{-1}(q_{s_k}^k - q_{d_k}^k)]_0^{L_k} \tag{8}$$

where $[z]_a^b := \min\{\max(a, z), b\}$.

If $U_k'(0)=(0)$, it can be seen that the profit obtained by the (admission) rate controller $\Theta_k(y^{*k})$ is nonnegative because $U_k(y_k) \geq U_k'(y_k)y_k$, implied by the concavity of $U_k(\cdot)$.

Similarly, with a given pricing scheme q, the optimal resource allocation policy can be obtained by solving (7), which can be easily verified to be as follows. Theorem 2 (A pressure-based c μ-rule): The optimal solution that solves (7) is given by: for each node $u \in V$, $$y_{uv}^{*k} = \begin{cases} \mu_{uv}^k = \dfrac{R_u}{\tilde{r}_{uv}^k} & \text{if } k = k_u^{max} \text{ and } v = v_u^{max} \\ 0 & \text{otherwise} \end{cases} \tag{9}$$

Where $$(k_u^{max}, v_u^{max}) = \arg \max_{k \in \mathcal{K}, v \in L_O(u)} \mu_{uv}^k (q_u^k - q_v^k)^+ \tag{10}$$

If $q_u^k - q_v^k \geq 0$ for all $k \in \mathcal{K}$, $v \in \mathcal{L}_O(u)$, simply set $(k_u^{max}, u_u^{max}) = 0$, and set $y^* = 0$.

Note that μ can be interpreted as the service rate of commodity k on node u with downstream node v. Theorem 2 simply says that the optimal resource allocation policy is to schedule only the commodity that can provide the maximum earning ratio (i.e. processing rate $\mu_{uv}^k$ times the pressure (price difference) $q_u^k - q_v^k$) If it cannot get a positive profit from any commodity, the node just idles.

Note that for each node u, the above resource allocation scheme operating in accordance with aspects of the invention only requires information from the neighboring nodes, thus it can be carried out in a distributed manner.

The remaining problem now is how to design a price scheme represented by the Lagrangian multipliers q which works the best. Note that in the eye of the price scheme designers, the profits by those selfish nodes and flow controllers are in fact their anticipated operating costs, the objective of the designer is to minimize overall operating costs. This is in fact the physical meaning of the dual problem (5).

Due to the strict concavity assumption of $U_k(\cdot)$ and the convexity of the feasible region of (P), there exists a unique optimizer of the primal problem, which is referred to as $x^*$. Based on the duality theory, there exists a nonempty set $Q^*$ of optimal Lagrangian multipliers that satisfy $\Sigma_{k \in \mathcal{K}} U_k(x^*{}_k) = D(q^*)$, for all $q^* \in Q^*$. That is, the duality gap vanishes. In addition, the optimal solution $(x^*, y^*)$ of Lagrangian $L(x, y, q^*)$ for any $q^* \in Q^*$ is also an optimal solution of the original problem (P). Therefore, if an appropriate sequence of q[t] is chosen such that $q[t] \to q^* \in Q^*$ as $t \to \infty$, the corresponding solutions x[t] and y[t] can be obtained by solving (6) and (7), which would converge to the optimal $x^*$ and $y^*$.

In order to minimize D(q), the derivative of D(q) is taken over $q_u^k$:

$$\frac{\partial D}{\partial q_v^k} = -\Delta Q_v^k,$$

where $$\Delta Q_v^k = \sum_{u:(u,v) \in \mathcal{E}} y_{uv}^{*k} - \sum_{u:(v,u) \in \mathcal{E}} y_{vu}^{*k} + x^{*k}(1_{\{v=s_k\}} - 1_{\{v=d_k\}}).$$

By using the subgradient method [5], q can be solved iteratively as follows:

$$q_u^k[t+1] = q_u^k[t] + h_t \Delta_u^k[t].$$

If the step-size sequence $\{h_t\}_{t=0}^{\infty}$ is chosen such that $\lim_{t \to \infty} h_t = 0$ and $\Sigma_{t=0}^{\infty} = \infty$, then $q[t] \to q^*$ as $t \to \infty$.

Suppose each node maintains a separate queue for each commodity k and time is slotted. $Q_u^k[t]$ is used to denote the backlog of commodity k at node u at time t. The evolution of queue size $Q_u^k[t]$ is then given by $$\Delta Q_u^k[t] = Q_u^k[t+1] - Q_u^k[t] \quad (11)$$
$$= \sum_{v \in L_I(u)} y_{vu}^k[t] - \sum_{v \in L_O(u)} y_{uv}^k[t] +$$
$$x_k[t](1_{u=s_k} - 1_{u=d_k}).$$

Here $\Delta Q_u^k[t]$ is simply the excess of commodity k at node u at time t. Therefore, if $h_t = h$ is set to be constant and $q[0] = 0$, then $q_u^k[t+1] = h \Sigma_{t=0}^{t-1} \Delta Q_u^k[t] = h Q_u^k[t]$. That is, the price of processing a unit amount of commodity k at node u is proportional to the corresponding queue length. When h is sufficiently small, the corresponding pricing scheme will be eventually very close to the optimal price scheme q*.

The optimal (admission) rate control given by (8) is essentially a dual-based controller, which assumes the rates can be changed instantaneously in response to congestion feedback in the network. However, it is well-known that adaptive window control mechanisms such as TCP respond to congestion feedback not instantaneously, but gradually. Such a response is more desired by practitioners as the rate fluctuations are small. It is shown in [22] that different versions of TCP can be modeled by the following rate evolution:

$$\dot{x}_k[t] = \kappa_k(x_k[t])(U'(x_k[t]) - (Q_{s_k}^k[t] - Q_{d_k}^k[t])), \forall k \in \mathcal{K},$$

where $\kappa_k(\cdot)$ is any non-decreasing, continuous function with $\kappa_k(x) > 0$ for any $x > 0$.

A similar approach as [22] is adopted and consider a TCP friendly rate control scheme as follows:

$$\dot{x}_k[t] = x_k[t+1] - x_k[t] = \alpha\left[\frac{1}{h}U'_k(x_k[t]) - (Q_{s_k}^k[t] - Q_{d_k}^k[t])\right], \quad (12)$$

where α is a tunable parameter that can impact the convergence speed, and the parameter h will be used to ensure small duality gap thus guarantee convergence to the optimum. Note that the corresponding pricing scheme is simply $q[t] = hQ[t]$.

Clearly, the smaller the h, the closer q[t] can converge to the optimal pricing scheme. On the other hand, a smaller h will make the queueing backlog in the system much larger as $Q[t] = q[t]/h$. Similarly, the smaller the α, the more gradual the rates change (thus more TCP friendly). On the other hand, the algorithm converges faster with a greater α. One therefore needs to trade off the quality of the solution with manageable queueing backlog, and trade off the convergence speed with (TCP) tolerable rate adjustments. In the following section, a simulation is used to identify practical values for α and h.

A distributed algorithm operating in accordance with the invention is referred to as a primal-dual controller. In an iterative manner, the algorithm changes the admission rates, adjusts the rate (resource) allocation, and updates the queue sizes as follows.

In one embodiment of the invention a primal dual contoller operates as follows:
Primal-Dual controller (PD):
Step 0. Initialization.
  Set t=0, $x_k(0) = 0$, and $q_u^k(0) = hQ_u^k(0) = 0$ for all $k \in \mathcal{K}$, and $u \in \mathcal{V}$.
Step 1. Admisson Control.
  Obtain admission rate x[t] using (12).
Step 2. Resource Allocation.
  Obtain rate allocation y[t] using (9).

Step 3. Update the queueing dynamics $Q_u^k[t+1]$ using (11). Set $q[t+1] = hQ[t+1]$. Let $t \leftarrow t+1$, go back to Step 1.

The above algorithm can be viewed as a feedback control mechanism which adjusts the flow rates gradually based on congestion feedback from the network. By applying LaSalle's invariance principle of nonlinear systems [18], it can be proved that it guarantees the stability of the system and converges to optimality, stated as the following theorem.

Theorem 3 Under the primal-dual controller, the admission rate vector x[t] converges to x* as $t \to \infty$. Moreover, the queue length q[t] stays in a bounded set. The utility function in the above theorem is generally required to be strictly concave. A popular class of utility functions [19] is:

$$U_k(x) = \frac{w_k x^{1-\gamma}}{1-\gamma}, \gamma > 0.$$

For γ=1, the utility function becomes which is known as the weighted proportional fairness. As $\gamma \to 0$, the utility function approaches the linear function $$U_k(x) = w_k x. \quad (14)$$

The linear utility function (14) is no longer strictly concave. The primal-dual controller, however, is still applicable. In this case, (12) becomes $$x_k[t+1] = x_k[t] + \alpha\left[\frac{1}{h}w_k - (Q_{s_k}^k[t] - Q_{d_k}^k[t])\right]. \quad (15)$$

One can show that under the primal-dual controller, the admission rate still converges to the optimal solution with respect to the linear utility function.

Note that if one uses the dual-based rate controller defined by (8), the optimal rate control policy is an on-off policy: if $$\frac{w_k}{h} > Q_{s_k}^k[t] - Q_{d_k}^k[t],$$

the rate is $x_k^* = \lambda_k$; if $$\frac{w_k}{h} < Q_{s_k}^k[t] - Q_{d_k}^k[t],$$

the rate is $x_k^* = 0$; if $$\frac{w_k}{h} = Q_{s_k}^k[t] - Q_{d_k}^k[t],$$

one can choose any rate $x_k^* \in [0, \lambda_k]$. However, under the primal-dual controller where the rate is governed by (15), the rate adjustment is smoothed thus rates change more gradually.

In this section several variants of implementation methods for the primal-dual controller are discussed. Recall that the Lagrangian multipliers $q_u^k$'s are unrestricted in sign due to the equality constraint of (1). There is thus freedom in choosing variants of the queueing evolution, by setting different boundary condition on (11). Specifically, three variants are discussed: real queue, credit queue and virtual queue, and it is shown that these queue variants have great impact on the convergence speed of the primal-dual controller.

The following proposition is presented regarding the optimal Lagrangian multipliers which are useful for the selection of queues.

Theorem 4 Denote $\mathcal{Q}^*$ the set of optimal Lagrangian multipliers.
i. If $q \in \mathcal{Q}^*$, and $q+c \in \mathcal{Q}^*$, where $c=[c^k]$, and $c^k$ is constant for each k.
ii. There exists an optimal solution $q^* \in \mathcal{Q}^*$ such that $$q^*{}_{d_k}{}^k \leq q^*{}_u{}^k \leq q^*{}_{s_k}{}^k, \forall u \in V.$$

Real queues with the push-only method: Based on Theorem 4, for each commodity k, the value of $q_u{}^k$ can be fixed for an arbitrary node u and shift the rest $q_v{}^k$'s accordingly. If $q_{d_k}{}^k=0$, then from ii), there exists a non-negative solution of $q^*$. Q[t] can be defined using (11) with the boundary condition that $Q_u{}^k[t] \geq 0$. In this case, $Q_u{}^k[t]$ is implemented as the real queue size of commodity k at node u. For each time slot, $x_k[t]$ amount of commodity k is admitted to source node $s_k$, and all (commodity k) flows are immediately absorbed once reaching sink $d_k$. This controller is referred to as a push-only admission control, which uses the backlogs of real queues.

Credit queues with the pull-only method: Instead of having source nodes push flow into the network, an admission control policy can be implemented that inserts "flow credit" at sink nodes. The amount of "flow credit" at each node is equivalent to a queue with a negative length, which moves along in opposite directions to the directions of real flows. This corresponds to setting Q[t] by (11) with the boundary condition that $Q_u{}^k[t] \leq 0$. This controller is referred to as a pull-only admission control, where, as it demands a "flow credit" from a node, equivalently it borrows an amount (as specified by the credit) of flow from that node.

Rate allocation on real flows in the network is now guided by the decisions based on the credit pressure. If there is not enough (real) backlog at a node, all backlog is sent proportionally (to the given decision) to downstream nodes. Credit arriving at the corresponding source is redeemed by injecting the equal amount of real flows.

The disadvantage of the pull-only method is that each node must maintain the length of an artificial credit queue. There are, however, advantages. It will be seen in the simulation section that there are almost no accumulated flows at nodes.

Virtual queues with push-and-pull method: In an embodiment of the invention, the push-only and pull-only methods are combined together. At each iteration, $x_k$ amount of flow is pushed into source node $s_k$ and meanwhile the same amount of "flow credit" is demanded at the sink node $d_k$. In this case, $Q_u{}^k[t]$ is defined by (11) with no boundary condition, hence can be positive, zero, or negative. If $Q_u{}^k<0$, it corresponds to an amount of "flow credit" (a queue with a negative length). When the flow moves from node u to node j, it either increases the backlog of the flow, or redeems flow credit, at node j; meanwhile, it either decreases the backlog of flow, or creates flow credit, at node u. This controller is referred to as push-and-pull admission control and comprises an aspect of the invention.

With the push-and-pull admission control, a virtual queue is maintained at each node. Similar to the credit queue case, rate allocation on the real flows in the network is now guided by the decisions based on the virtual queue pressure. Since sources push flows from one side, and sinks pull flow simultaneously from the other side, intuitively, information propagates into the system much faster. Numerical experiments (detailed in the next section) further confirm the above intuition that the push-and-pull admission control converges much faster than the push-only or pull-only methods.

When the utility function is linear, a modified Awerbush-Leighton (MAL) method has been proposed in [6]. Here the MAL algorithm is reviewed and compared to the primal-dual (PD) algorithm.

In the MAL method, each node maintains local input and output buffers for each commodity. A queue of length $q_u{}^k$, is associated with potential $$\Phi_k(q_u^k) = \frac{1}{2}\left(\frac{q_u^k}{\lambda^k}\right)^2.$$

The algorithm is iterative in nature and, at each iteration, a node only needs to know the buffer levels at its neighboring nodes. It then uses this information to determine the appropriate resource allocation $y_{uv}{}^k \in Y$ that minimizes the total potential at that node, i.e.

$$\min \sum_k w^k \sum_{v: v \in L_o(u)} [\Phi_k(q_u^k - y_{uv}^k) + \Phi_k(q_v^k + y_{uv}^k)]$$

admission control is through a pre-specified parameter B which specifies the maximum allowed queue length, any flow that exceeds the upper bound B is lost. This local control mechanism can be shown to eventually converge to the optimal solution for linear utility functions.

The primal-dual controller (PD) operating in accordance with the invention differs from the MAL algorithm in at least three ways: 1) The admission control of PD is a feed-back control mechanism guided by the primal and dual approach, where the Lagrangian multiplier can be interpreted as the price of transferring flow in the current network based on congestion feedback. The MAL has a more naive method in admission control and may not work for nonlinear utility functions; 2) The resource allocation scheme of PD always sends the flow that has the maximum downstream earning ratio (pressure times the processing rate), whereas the MAL algorithm sends the flow purely based on pressure; 3) With the PD method, the weights $w_u$, is encoded into the source queue length and utilized at the stage of admission control, whereas with the MAL algorithm, the weights are utilized at the resource allocation stage through the weighted sum of the potential functions.

One final remark is that the pull mechanism can also be applied to the MAL algorithm. This introduces the push-only MAL, pull-only MAL, and push-and-pull MAL algorithms. Numerical comparisons are provided the next section.

The convergence speed of the PD algorithm is next illustrated through an example realized under the three variants of queues (real queue, credit queue and virtual queue) as discussed in the previous section. The PD algorithm is applied to both linear and nonlinear utility functions. For the nonlinear case, the log-utility function (13) is used which represents weighted proportional fairness. For the linear case, the utility function (14) is used, and compared to the performance achieved with the MAL algorithm proposed in our earlier work [6]. The three variants of queues are also adapted to the MAL algorithm, which introduces the push-only MAL, pull-only MAL, and push-and-pull MAL algorithms. Of those algorithms that use virtual or credit queues, the throughput of real queues is measured at sinks which are guided by the decisions made by virtual or credit queues.

Figure 4:
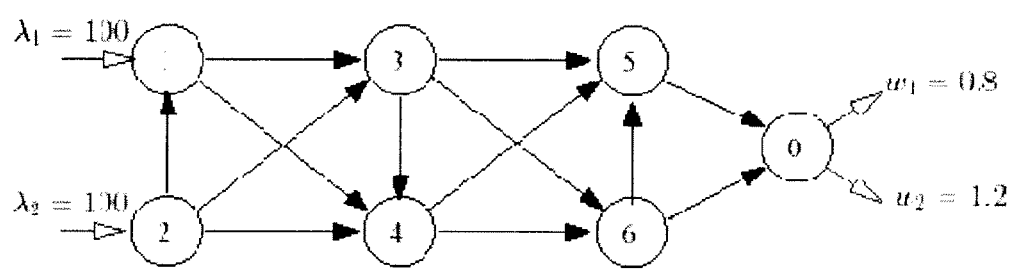
FIG. 4 is a block diagram depicting a stream processing network to be used for simulation purposes to test performance of methods operating in accordance with the invention.

Both the PD algorithm and the MAL algorithm are applied on a synthetic network containing 7 nodes and 2 source/sink pairs, corresponding to a 2-commodity problem as shown in FIG. 4. The node computing capacities are set to 100. The resource consumption parameters $y_{uv}^k$ are randomly generated with uniform distribution on [1,10]. The weights are set to 0.8 and 1.2 respectively for the two commodities. For the linear utility case, the system utility is the weighted sum of throughput of the 2 commodities. For the log utility case, the system utility is the weighted sum of log throughput.

Figure 5A:
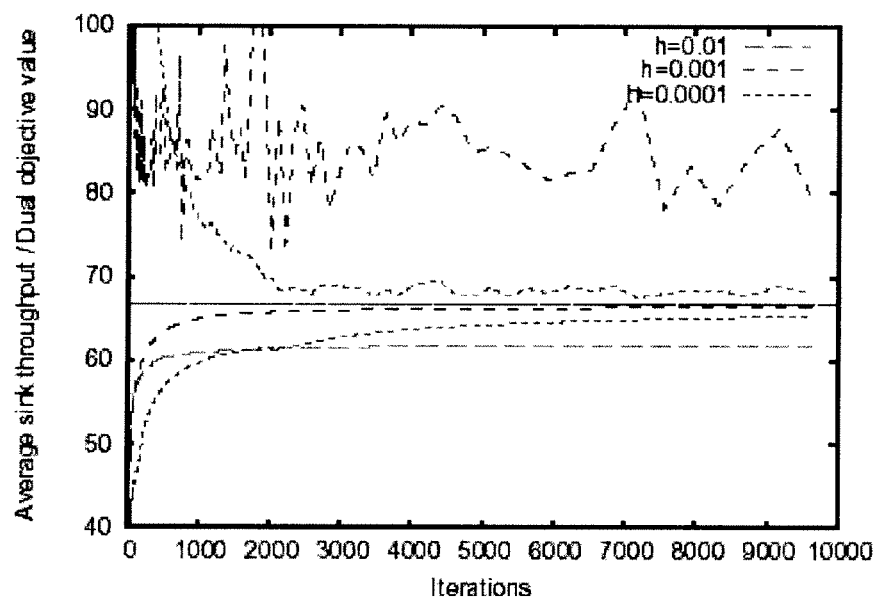
FIG. 5A is a graph depicting primal and dual values at each iteration under a PD controller operating in accordance with the invention in the stream processing network of FIG. 4 with various values of the h parameter.
Figure 5B:
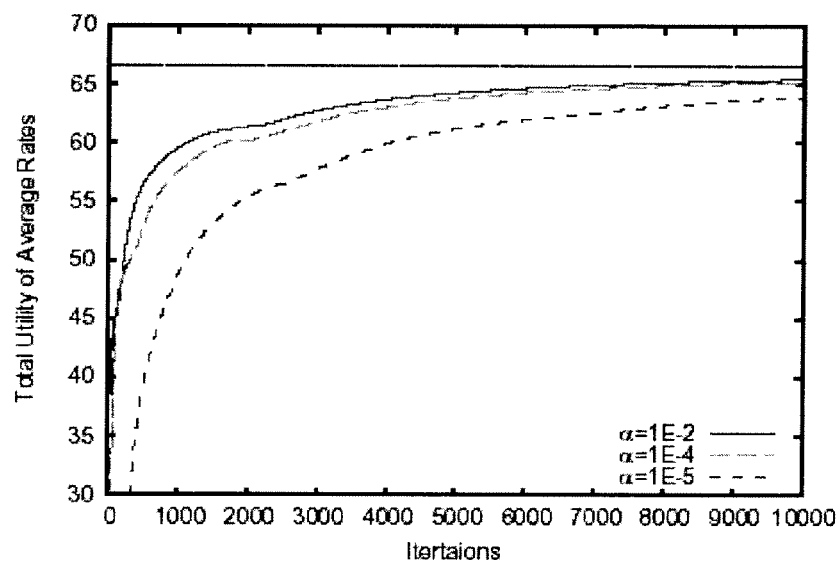
FIG. 5B is a graph depicting system utility at each iteration under a PD controller operating in accordance with the invention in the stream processing of FIG. 4.

Consider the linear utility case first. FIG. 5A shows the primal and dual values at each iteration under the PD controller, with three different choices of parameter $h=10^{-2}$, $10^{-3}$, $10^{-4}$. Observe that as h gets smaller, the duality gap also becomes smaller. FIG. 5B shows the system utility at each iteration under the PD controller with three different choices of parameter $a=10^{-2}$, $10^{-4}$, $10^{-5}$, where $h=10^{-4}$. Observe that the convergence is faster with a greater a. In the rest of simulation experiments, h and a are set as follows: $h=10^{-4}$ and $a=0.01$.

Figure 6A:
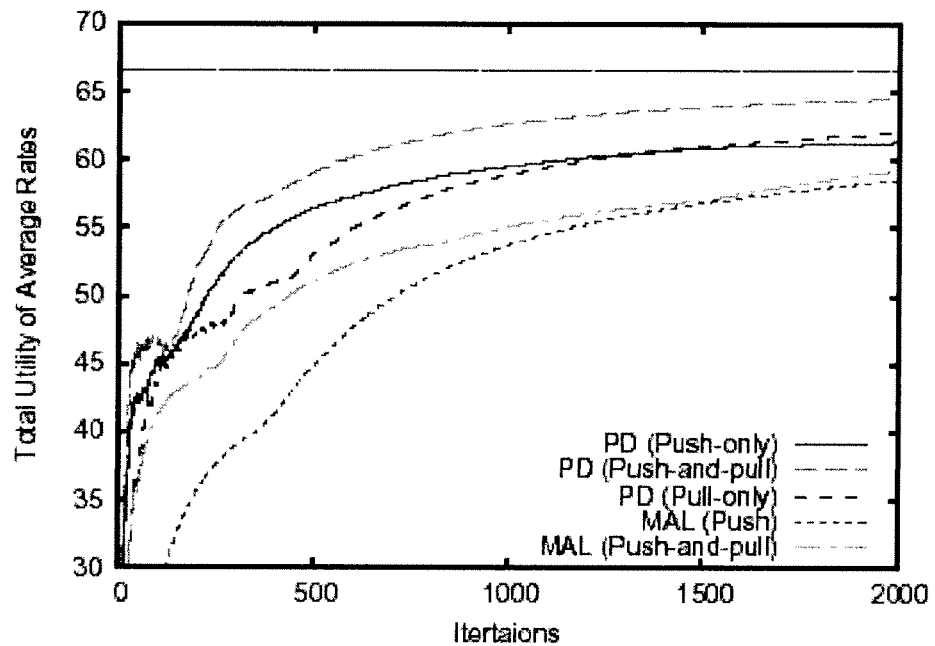
FIG. 6A is a graph depicting sums of utility values at each iteration under a PD controller operating in accordance with the invention and a MAL controller using push-only, pull-only and push-and-pull admission control algorithms.

FIG. 6A compares the sums of utility values at each iteration, under PD and MAL algorithms with three variants of the queues. The optimal utility value is approximately 66.6. It is seen that the push-and-pull PD algorithm performs the best, then followed by push-only PD algorithm, pull only PD algorithm, and the push-and-pull MAL algorithm, in this order. The worst one is the push-only MAL algorithm. The push-and-pull PD algorithm reaches 90% optimal near 600 iterations, and without the push-and-pull mechanism it requires more than 1500 iterations. All PD algorithms outperform the MAL algorithms.

Figure 6B:
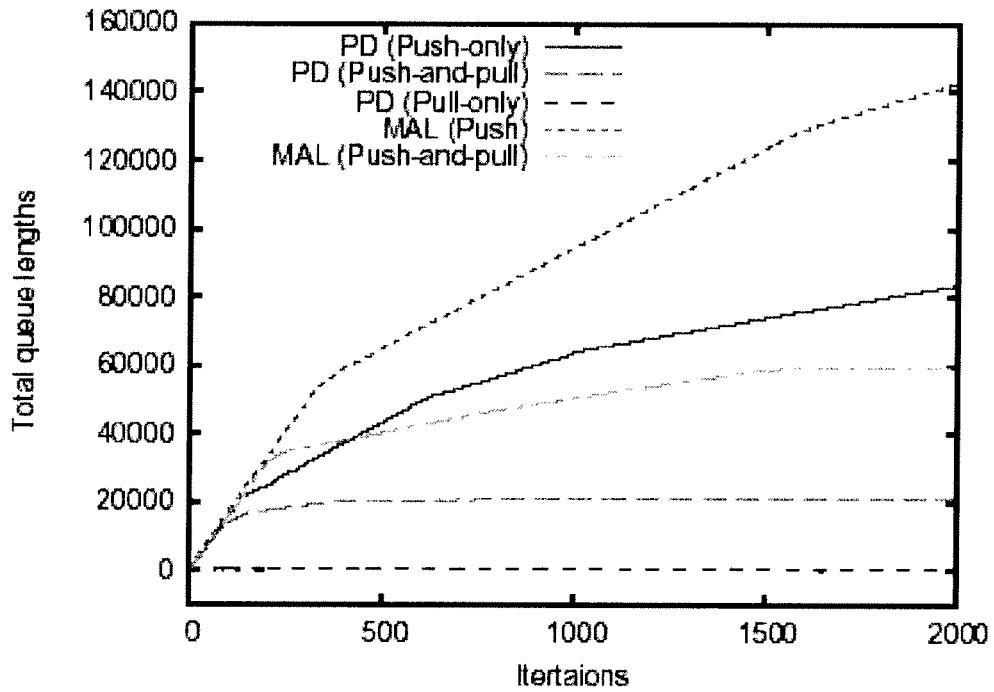
FIG. 6B is a graph depicting total queue length of all commodities at each iteration under a PD controller operating in accordance with the invention and a MAL controller using push-only, pull-only and push-and-pull admission control algorithms.

FIG. 6B shows the total queue length of all commodities at each iteration. Observe that the pull-only PD algorithm holds a negligible amount of flows in the system at all times. All push-and-pull algorithms hold less than half amount of the flows comparing to the corresponding push-only algorithms. All PD algorithms hold less flow than MAL algorithms.

Figure 7A:
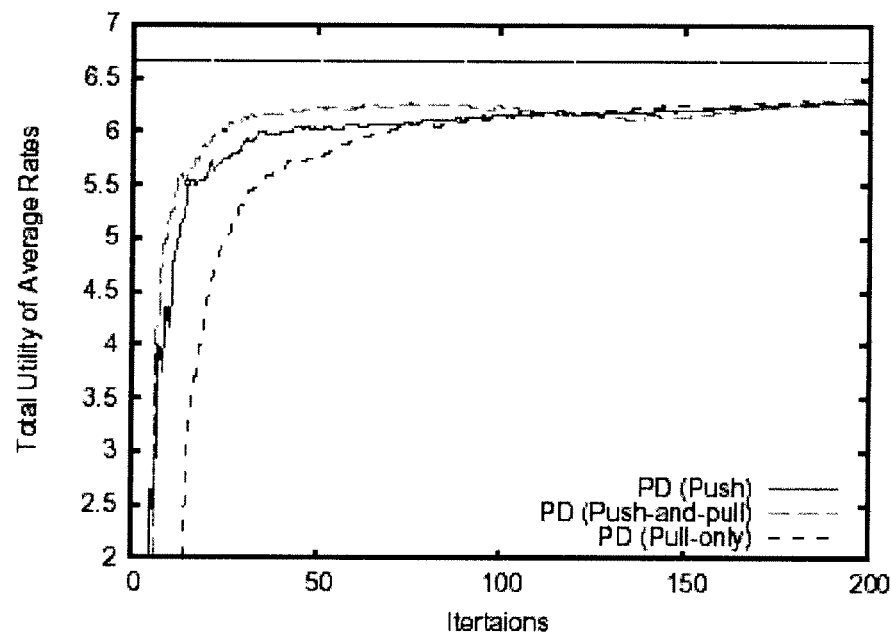
FIG. 7A is a graph depicting the total log utility value at each iteration for three different admission control methods implemented by a primal dual algorithm operating in accordance with the invention.
Figure 7B:
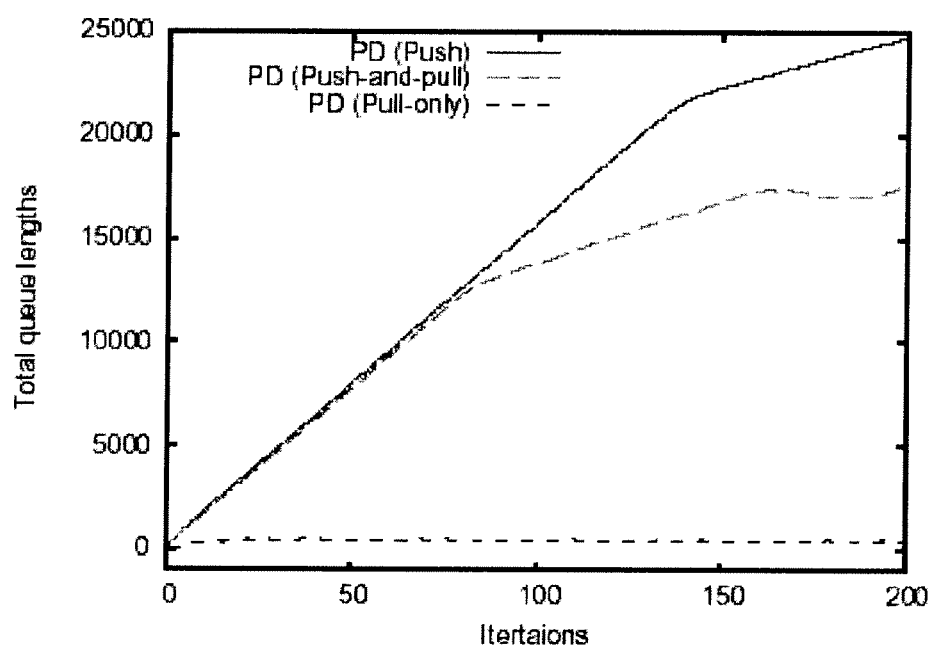
FIG. 7B is a graph depicting a comparison of the total queued flows in the system at each iteration for three control methods implemented by a primal dual controller operating in accordance with the invention.

FIGS. 7A-B corresponds to the performance under the log utility function. Since a version of MAL algorithm has not been developed that can handle non-linear utility functions, only the PD algorithms realized under the three variants of queues are compared. Again it is seen that the push-pull method converges the fastest and the pull-only method the slowest. Although in this case the convergence speed of the push-only method is also close to that of the push-and-pull method, the total queue length is much larger than that of the push-and-pull method. Comparing with the linear utility case, it is seen that, with the log utility function, the convergence is faster with much less amount of the total queued flows.

In summary, the problem of dynamic admission control and distributed resource control of a stream processing system so that the overall system utility is maximized has been studied. The system is resource constrained in computing power at each server and in bandwidth capacity over the various communication links. A distributed algorithm operating in accordance with the invention has been presented which incorporates in various embodiments a push-and-pull based admission control mechanism, and a max pressure-based cμ-rule for resource allocation. It was shown that the algorithm results in a stable network and converges to the optimal solution.

In another embodiment of the invention to be described as follows an interior-point method is used to increase speed of convergence of iterative processes used by the primal-dual controller of the previously-described embodiments to reach optimal workflow admission and resource allocation solutions. In review, a multi-commodity flow problem is considered on a directed graph ($\mathcal{V}$, $\epsilon$). The numbers of nodes and edges are denoted by $N=|\mathcal{V}|$ and $M=|\epsilon|$, respectively. There are K commodity flows, denoted by $\mathcal{K}$. Each commodity flow $k \in \mathcal{K}$, has a single source node, denoted by $s_k$, and a single sink (destination) node, denoted by $d_k$. Also associated with commodity k is a second-order continuous and concave function $U_k(x^k)$, where $x^k$ is the flow rate of commodity k, which is non-negative and bounded above by $\lambda^k$, the offered rate of commodity k. The objective is to maximize the sum of the utility functions of all commodities with respect to the flow rate vector $x:=[x^k]_{k \in \mathcal{K}}$, i.e., $$\max_{0 \leq x^k \leq \lambda^k} \{P(x) := \sum_{k \in \mathcal{K}} U_k(x^k)\} \quad (16)$$

subject to constraints as follows, $$\sum_{v:(v,u) \in \epsilon} y_{vu}^k - \sum_{v:(u,v) \in \epsilon} y_{uv}^k + x^k(1_{\{u=s_k\}} - 1_{\{u=d_k\}}) = 0, \quad (17)$$

$$\forall u \in \mathcal{V}, \forall k \in \mathcal{K},$$

$$\sum_{v:(u,v) \in \epsilon} \sum_{k \in \mathcal{K}} y_{uv}^k c_{uv}^k \leq C_u, \forall u \in \mathcal{V}, \quad (18)$$

$$y_{uv}^k \geq 0, \forall u, v \in \mathcal{V}, \forall k \in \mathcal{K}, \quad (19)$$

where $1_e$ is the indicator function of event e. The (flow) conservation constraints are given by (17), where $y_{uv}^k$ is the flow rate of commodity k on edge (u, v). This is a non-negative value, as indicated by (19), meaning that all edges are directed. The (resource) capacity constraints are given by (18), where $C_u$ is the total resource capacity on node u, $c_{uv}^k$ is the resource requirement by a unit flow of commodity k on node u, given that the downstream node is v.

The dual method can be applied on (16). For each of constraints in (2) a Lagrangian multiplier $q_u^k$ is introduced. The Lagragian is then written $$L(x, y, q) = \sum_{k \in \mathcal{K}} U_k(x^k) - \sum_{k \in \mathcal{K}} \sum_{u \in \mathcal{V}} q_u^k \left[ \sum_{v:(v,u) \in \epsilon} y_{vu}^k - \sum_{v:(u,v) \in \epsilon} y_{uv}^k + x^k(1_{\{u=s_k\}} - 1_{\{u=d_k\}}) \right] \quad (20)$$

$$= \sum_{k \in \mathcal{K}} [U_k(x^k) - x^k(q_s^k - q_d^k)] + \sum_{(u,v) \in \epsilon} y_{uv}^k(q_u^k - q_v^k),$$

where $y=[y_{vu}^k]_{v,u \in \mathcal{V}, k \in \mathcal{K}}$ is the vector of routing decisions subject to (18) and (19), and $q=[q_u^k]_{u \in \mathcal{V}, k \in \mathcal{K}}$ is the vector of Lagrangian multipliers. Note that $q_s^k:=q_{s_k}^k$ and $q_d^k:=q_{d_k}^k$ are those multipliers corresponding to the source and sink nodes of commodity k, respectively.

Maximizing over the primal variables (x, y), the dual objective function is obtained as follows.

$$D(q) := \max_{x,y} L(x, y, q) \quad (21)$$

$$= \sum_{k \in \mathcal{K}} \Theta_k(q) + \sum_{u \in \mathcal{V}} \Phi_u(q)$$

where $$\Theta_k(q) := \max_{0 \leq x^k \leq \lambda^k} [U_k(x^k) - x^k(q_s^k - q_d^k)] \quad (22)$$

and $$\Phi_u(q) = \max_{y_{uv}^k \geq 0, \forall v:(u,v)\in\epsilon, k\in\mathcal{K}} \sum_{v:(u,v)\in\epsilon} \sum_{k\in\mathcal{K}} y_{uv}^k(q_u^k - q_v^k), \quad (23)$$

subject to (18) and (19).

One physical meaning of the quantity $q_u^k$ is a price given by node u for processing a unit amount of commodity k. Consequently, the function $\Phi_u(q)$ in (23) means the profit of node u for a price scheme of q. Each node u tries to maximize its own profit, i.e., the sum of earning rates from each flow. The earning rates from flow k is the amount of flow processed per unit time, times the amount the earnings per unit flow, which the price difference between what it receives from the upstream nodes, and what it pays the the downstream nodes. The function $\Phi_k(q)$ is the profit collected by the rate controller of commodity k, which is the utility value (i.e., what it receives from the customer) minus the amount paid to the nodes on the processing path, as indicated by (22).

From (22), the optimal control policy for commodity k can be obtained if the price scheme q is given:

$$\Theta_k(q) = U_k(x^{*k}) - x^{*k}(q_s^k - q_d^k), x^{*k} = [(U'_k)^{-1}(q_s^k - q_d^k)]_0^{\lambda^k}, \quad (24)$$

where $[x]_a^b := \min\{\max\{a, x\}, b\}$. If $U_k(0)=0$, it can be seen that the profit obtained by flow controller, $\Theta_k(x^{*k})$, is non-negative because $U_k(x^k) \geq U'_k(x^k)x^k$, as implied by the concavity of $U_k(\cdot)$.

Similarly from (22), the optimal scheduling policy of node u can be obtained, if the price schedule q is given:

$$\Phi_u(q) = \left(\max_{v:(u,v)\in\epsilon, k\in\mathcal{K}} \mu_{uv}^k(q_u^k - q_v^k)\right) \vee 0, \quad (25)$$

where $\mu_{uv}^k := C_u/c_{uv}^k$ is the service rate of commodity k on node u with the downstream node v. The maximum is obtained at $$y_{uv}^{*k} = \begin{cases} 0 & \Phi_u(q) = 0, \text{ i.e., } q_u^k - q_v^k \leq 0, \forall v:(u,v) \in \epsilon \\ \mu_{uv}^k = \dfrac{C_u}{c_{uv}^k}, & \text{if } k = \hat{k}, v = \hat{v} \\ 0 & \text{otherwise,} \end{cases} \quad (26)$$

where $$(\hat{k}, \hat{v}) \in \arg\max_{k\in\mathcal{K}, v:(u,v)\in\epsilon} \mu_{uv}^k(q_u^k - q_v^k).$$

In other words, the optimal scheduling policy is to schedule only the commodity that can provide the maximum earning ratio (i.e., processing rate $\mu_{uv}^k$ times the price difference $q_u^k - q_v^k$). It can certainly be seen from (26) that the profit $\Phi_u(q)$ is always non-negative: if it cannot get a positive profit from any commodity, the node just idles.

The remaining problem now is how to design a price scheme represented by vector q which works best. Note that in the eye of the price scheme designers, the profits by those selfish nodes and flow controllers are in fact their anticipated operating costs, and objective of the designer is to minimize overall cost. This is in fact the physical meaning of the dual problem:

$$\min_q D(q). \quad (27)$$

By the duality theory, $D(q) \geq P(x)$, and the difference between them is the duality gap. In the settings of this problem this gap vanishes.

In order to minimize D(q), take the derivative of D(q) over $q_u^k$:

$$\frac{\partial D}{\partial q_u^k} = -\left[\sum_{v:(v,u)\in\epsilon} y_{vu}^{*k} - \sum_{v:(u,v)\in\epsilon} y_{uv}^{*k} + x^{*k}(1_{\{u=s_k\}} - 1_{\{u=t_k\}})\right], \quad (28)$$

where $x^* = [x^{*k}]_{k\in\mathcal{K}}$ and $y^* = [y_{vu}^{*k}]_{(v,u)\in\epsilon, k\in\mathcal{K}}$ are optimal solutions of (22) and (23). By using the discretized version of steepest descent method on (28), an iterative method for solving q results as follows, $$q_u^k[t+1] = q_u^k[t] + h_t \Delta Q_u^k[t] \quad (29)$$

where $$\Delta Q_u^k[t] = \sum_{v:(v,u)\in\epsilon} y_{vu}^k - \sum_{v:(u,v)\in\epsilon} y_{uv}^k + x^k(1_{\{u=s(f)\}} - 1_{\{u=t(f)\}}), \quad (30)$$

and $h_1$ is a step size introduced by discretization. Clearly $\Delta Q_u^k[t]$ is the excess of commodity k at node u; it is zero if the flow is balanced. In case that $h_1 \equiv h$ is constant and the initial value of q at time 0 is zero and a non-negative vector of q is maintained, the following is obtained:

$$q_u^k[t+1] = hQ_u^k[t] = h\sum_{i=0}^{t-1} \Delta Q_u^k[t], \quad (31)$$

where $Q_u^k[t]$ is the accumulated amount (i.e., queue length) of commodity k at node u. With the node scheduling and flow control policies given by (24) and (26), respectively, (31) provides a distributed and iterative algorithm to solve (16) based on the queue lengths at each node. The individual price is proportional to its corresponding queue length. As used herein, this algorithm is referred to as the queue algorithm.

This kind of queue algorithm has been studied recently by many researchers, although in somewhat different settings from one to another. It has been argued that the queue algorithm is stable and the vector q[t] converges to a small neighborhood of the optimal q* as t→∞ (See, for example [19]). However, some issues remain; they have been either overlooked or underestimated in the past. Let us state a few of them that shall motivate our new algorithm as follows.

1. Performance. Although theoretically the queue algorithm should be converging to somewhere close to optimal, but the convergence might be very slow.

2. Large amount of queued flow. With a small h, the queued commodity at intermediate node on the path becomes excessively large, and therefore impractical. This can be seen from (16), noting that the solution of q is at a fixed magnitude.

3. Primal solution. Whether or not (24) and (26) really provides the unique optimal solution for the primal problem (16)?

The third issue will be discussed in a following. The first two issues will be further confirmed. The first issue will be explored to see if there are reasons for a slow convergence, by analyzing the dual function D(q).

There are two possible reasons that this queue algorithm may be inefficient. The first reason is that the maximum possible change of each $q_u^k$ is limited at each iteration, since the $\Delta Q_u^k$ is bounded above and below (by the sum of incoming bandwidth and negative value of the outgoing bandwidth, respectively). The change of $q_u^k$ at each iteration could be very small for the case that a small h is chosen to ensure the convergence to some point close to optimum. The second reason is that the dual function D(q) is such a function that the steepest descent algorithm is inefficient, which frequently happens.

For a node u, (25) can be rewritten as follows:

$$\Phi_u(q) = \min_{\phi_u \geq 0} \phi_u \quad (32)$$

subject to $$\phi_u - \mu_{uv}^k q_u^k + \mu_{uv}^k q_v^k \geq 0, \forall v:(u,v) \in \epsilon, \forall k \in \mathcal{K}. \quad (33)$$

Clearly, $\Phi_u(q)$ is a piecewise linear and convex function of q.

Suppose $U_k(\cdot)$ is concave and increasing, (24) can be rewritten as $$\Theta_k(q) = \overline{\Theta}_k(q_s^k - q_d^k) \quad (34)$$

where $$\overline{\Theta}_k(z) := U_k(Y_k(z)) - zY_k(z) \quad (35)$$

is a function with a single variable, and $Y_k(\cdot)$ is defined as $$Y_k(z) = \begin{cases} 0 & z > U'(0) \\ (U_k')^{-1}(z) & U'(\lambda^k) \leq z \leq U'(0) \\ \lambda^k & z < U'(\lambda^k) \end{cases} \quad (36)$$

Clearly $Y_k(z)$ is a decreasing function and non-negative, and continuous if $U(\cdot)$ is strictly concave and increasing and $U'(\cdot)$ is strictly increasing. The following lemma comfirms that the function $\Theta(q)$ is convex:

Proposition 1. The function $\overline{\Theta}_k(z)$ as defined in (35) is a convex function, if $U_k(\cdot)$ is concave.

Proof. From examination, $$\frac{d\overline{\Phi}}{dz} = \begin{cases} 0 & z > U'(0) \\ -(U_k')^{-1}(z) & U'(\lambda^k) \leq z \leq U'(0) \\ -\lambda^k & z < U'(\lambda^k), \end{cases}$$

is clearly decreasing. Hence $\overline{\Theta}_k(z)$ is convex.

For linear utility functions $U_k(z) = w_k x^k$, the following results:

$$\Theta_k(q) = \lambda^k (w_k - q_s^k + q_d^k) \cup 0. \quad (37)$$

The optimal rate control policy is an on-off policy: if $w_k > q_s^k - q_d^k$, the rate is $\lambda_k$ and if $w_k < q_s^k - q_d^k$, the rate is 0. If $w_k = q_s^k - q_d^k$, commodity k can be sent in any feasible rate.

Note that the convex function $\Theta_k(q)$ can be rewritten as $$\Theta_k(q) = \min_{\theta^k \geq 0} \theta^k \quad (38)$$

subject to $$\theta^k \geq \lambda^k (w_k - q_s^k + q_d^k). \quad (39)$$

In this case, the $\Theta_k(q)$ is also a piecewise linear convex function.

Figure 8A:
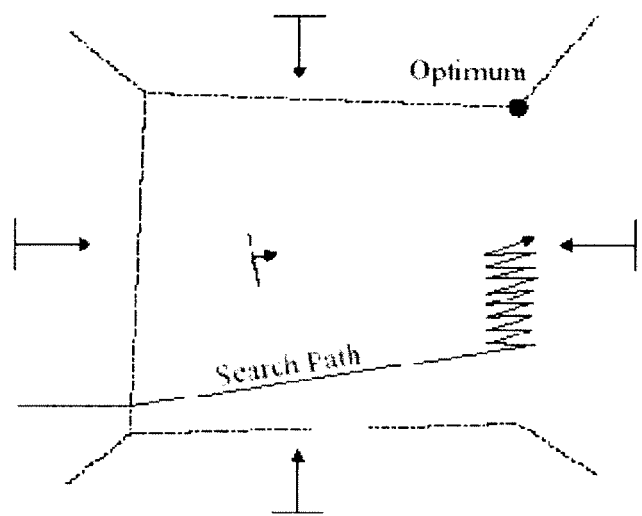
FIG. 8A is a chart depicting a search path for the steepest descent method showing sub-optimal zig-zag convergence behavior.
Figure 8B:
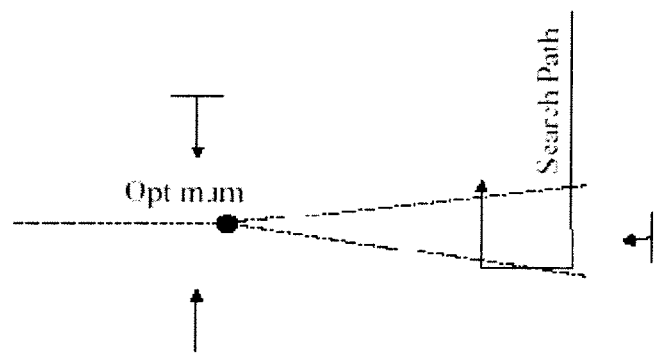
FIG. 8B is a chart depicting a search path for the steepest descent method converging somewhere far from the optimal solution.

Clearly the dual function D(q) is a piecewise linear convex function for linear utility functions; even if the utility has a strictly negative second-order derivative, D(q) is still a convex function with smooth pieces, most of them are linear. It is not difficult to imagine the poor behaviors of the steepest descent method on a piecewise linear convex function. There would be many zig-zags and circular paths (FIG. 8A), and it is even possible for it to converge somewhere far from the optimum (FIG. 8B). Numerical results detailed later further confirm this claim: the simple dual iterative method by (29) performs poorly in convergence. Furthermore, it will not be helpful to use a better search methods like conjugate gradient method or Newton's method, as the second order derivative of D(q) is zero almost everywhere. The best way to minimize a piecewise linear function is to convert it into a linear programming problem; however, by doing so the problem becomes non-distributed as the primal problem in 1, and therefore is not a choice. In order to solve the problem more efficiently but still in a distributed favor, a distributed version of the interior-point method operating in accordance with an embodiment of the invention is described in the following sections.

Consider only the linear utility functions, and note that these kind of framwork can be extended to non-linear utility functions. With $\phi = [\theta_u]_{u \in V}$, $\theta = [\theta^k]_{k \in \mathcal{K}}$, $\gamma = [\gamma_u]_{u \in V} \cup [\gamma^k]_{u \in V}$, the dual objective function is defined with additional log-barrier items:

$$\min_{q,\phi,\theta} D_\gamma(q, \phi, \theta) = \sum_{k \in \mathcal{K}} \min_q \tilde{\Theta}^k(q; y) + \sum_{u \in V} \min_{q,\phi_u} \Phi_u(q, \phi_u; \gamma), \quad (40)$$

where $$\tilde{\Theta}^k(q, \theta^k; \gamma^k) = \theta^k - \gamma^k \log \theta^k - \gamma^k \log[\theta^k - \lambda^k(w_k - q_s^k + q_d^k)]$$

and $$\Phi_u(q, \phi_u; \gamma_u) = \phi_u - \gamma_u \log \phi_u - \gamma_u \sum_{u:(u,v) \in \epsilon} \sum_{k \in \mathcal{K}} \log\left(\frac{\phi_u - \mu_{uv}^k q_u^k +}{\mu_{uv}^k q_v^k}\right), \quad (41)$$

with positive values of $\gamma$.

Taking the derivative of $\overline{D}(q)$ with respect to q and $\phi$, the following results:

$$\frac{\partial D_\gamma(\theta)}{\partial \theta^k} = 1 - \frac{\gamma^k}{\theta^k} - \frac{\gamma^k}{\theta^k - \lambda^k(w_k - q_s^k + q_d^k)}, \quad (42)$$

$$\frac{\partial D_\gamma}{\partial \phi_u} = 1 - \frac{\gamma_u}{\phi_u} - \sum_{v:(u,v) \in \epsilon} \sum_{k \in \mathcal{K}} \frac{\gamma_u}{\phi_u - \mu_{uv}^k q_u^k + \mu_{uv}^k q_v^k},$$

$$\frac{\partial D_\gamma}{\partial q_u^k} = \gamma_u \sum_{v:(u,v) \in \epsilon} \frac{\mu_{uv}^k}{\phi_u - \mu_{uv}^k q_u^k + \mu_{uv}^k q_v^k} - \sum_{v:(v,u) \in \epsilon} \frac{\gamma_v \mu_{vu}^k}{\phi_v - \mu_{vu}^k q_v^k + \mu_{vu}^k q_u^k} - \quad (43)$$

$$1_{\{u=s_k\}} \frac{\gamma^k \lambda^k}{\theta^k - \lambda^k(w_k - q_s^k + q_d^k)} + 1_{\{u=d_k\}} \frac{\gamma^k \lambda^k}{\theta^k - \lambda^k(w_k - q_s^k + q_d^k)}$$

It is now seen that $D_\gamma(q, \phi, \theta)$ is a smooth function. As $\gamma := [\gamma_u, \gamma^k]_{u \in V, k \in \mathcal{K}}$ approaches to zero, (41) it becomes closer and closer to the original dual problem (27). Certainly a γ can be chosen small enough to minimize $\bar{D}(q, \gamma)$; however, it can be seen that the greater γ is, the smoother $D_\gamma$ is, and probably therefore the more efficient the optimization algorithms are. Based on this idea, an iterative optimization algorithm in accordance with another embodiment of the invention is described in the following section.

If at each iteration, the optimal solution of $D_\gamma(q, \Phi)$ can be obtained for a given γ, quantities $\partial D_\gamma/\partial \phi_u$ and $\partial D_\gamma/\partial \phi_u^k$ should both be zero (or close to zero). Then, with a given $\gamma_u$, $\phi_u$ and $q_u^k$ can be computed if $q_v^k$ are known for all neighboring node v by solving K+1 non-linear equations; or, if $\phi$ and q are known, $\gamma_u$ can be computed by solving a single equation $\partial \bar{D}/\partial \phi_u = 0$. For the former case, the quantity $q_v^k$ is not known, but the value of previous iteration can be used to approximate; similarly, instead of intractably solving K+1 non-linear equations all together, $\phi_u$ is first solved through $\partial \tilde{D}/\partial \phi_u = 0$, by using the current $\gamma_u$ and the value of q from the last iteration, and solve each $q_u^k$ by $\partial \tilde{D}/\partial q_u^k = 0$ independently. The detailed algorithm is given as follows.

Initially, for each $u \in V$ and/or $k \in K$, set t=0, $q_u^k[0]=0$, $\gamma_u$ to be a reasonable positive value. All nodes know the choice of $\gamma_u$ of neighbors.

1. Flow Controller Algorithm

At each iteration, the flow controllers do the following
1. Determine a $\delta^k[t+1] \in (0, 1]$.
2. Let $\gamma^k[t+1] \leftarrow \delta^k[t+1]\gamma^k[t]$.
3. Set $\theta^k[t+1] \leftarrow z$ where z is a solution of $$\frac{1}{z} - \frac{1}{z - \lambda^k(w_k - q_s^k + q_d^k)} = \frac{1}{\gamma^k[t+1]}.$$

2. Node Algorithm

At each iteration, each node u proceeds as follows.
1. Determine a $\delta_u[t+1] \in (0,1]$.
2. Let $\gamma_u[t+1] \leftarrow \delta_u[t+1]\gamma_u[t]$.
3. Set $\Phi_u[t+1] \leftarrow z$ where z is a solution of $$\frac{1}{z} + \sum_{v:(u,v)\in \epsilon} \sum_{k\in K} \frac{1}{z - \mu_{uv}^k(q_u^k[t] - q_v^k[t])} = \frac{1}{\gamma_u[t+1]} \quad (44)$$

with positive denominators $\Phi_u[t+1]$ and $\Phi_u[t+1] - \mu_{uv}^k(q_u^k[t] - q_v^k[t])$ 4. Set $q_u^k[t+1] \leftarrow \delta_u^k[t+1]z$ for each commodity k, where z is a solution of $$1_{\{u=d_k\}} \frac{\gamma^k}{(q_s^k[t] - w_k + \theta^k[t]/\lambda^k) - z} + \sum_{v:(u,v)\in\epsilon} \frac{\gamma_u[t+1]}{(q_v^k[t] - \phi_u[t+1]/\mu_{uv}^k) - z} = \qquad (45)$$
$$1_{\{u=s_k\}} \frac{\gamma^k}{z - (q_d^k[t] + w_k - \theta^k[t]/\lambda^k)} + \sum_{v:(v,u)\in\epsilon} \frac{\gamma_v[t+1]}{z - (q_v^k[t] - \phi_v[t]/\mu_{vu}^k)},$$

where $\phi_u$, $\gamma_u$, estimate of $\gamma_v$ for each neighbor v are updated, where $q_v^k$ and $\phi_v$ are the ones received during the end the previous iteration. The value of $\Delta_{uv}^k[t+1]$ is between 0 and 1 such that all denominators will be well above zero during the next iteration.

5. Notify the neighboring nodes the values of $\phi_u[t+1]$, $q_u^k[t+1]$, and, if necessary, $\gamma_u[t+1]$.
6. Let $t \leftarrow t+1$.

Note that (44) and (45) has unique solution as along as at time t the solution is feasible, i.e, all denominators in (42) and (43) are positive. The value of $\phi_u$ is in fact an estimate the optimal profit at node u, since it approaches to the actual optimal profit with $\gamma \to 0$. This value is always greater than the current profit, as all feasible z's in (44) are greater than $\Phi_u(q)$ in (25). The quantity $q_u^k$, as mentioned earlier, is the current price that node u charges for processing a unit amount of commodity k.

Clearly, as long as the solution for time t is feasible, each node or flow controller will generate a feasible solution at time t+1 alone. However, it needs to be confirmed that the solution is still valid, i.e., all denominators are strictly positive, after independent solutions are combined. Therefore, restrictions need to be imposed on the maximum changing range for $\theta^k$, $\phi_u$ and $q_u^k$.

The following is defined:

$$\Delta_u^k[t] := \phi_u[t] - \mu_{uv}^k(q_u^k[t] - q_v^k[t])$$

Suppose as $\phi_u[t+1]$ is set it is confirmed that $$\phi_u[t+1] - \mu_{uv}^k(q_u^k[t] - q_v^k[t]) \geq \eta_2 \Delta_{uv}^k[t],$$
$$\forall v:(u,v)\in\epsilon, \forall k\in K \qquad (46)$$

for some $0 < \eta_1 < 1$. Similarly, as $q_u^k[t+1]$ is set, the following is imposed:

$$\phi_u[t] - \mu_{uv}^k(q_u^k[t+1] - q_v^k[t]) \geq \eta_2 \Delta_{uv}^k[t], \forall v:(u,v)\in\epsilon, \qquad (47)$$

and $$\phi_v[t] - \mu_{uv}^k(q_u^k[t+1] - q_v^k[t]) \geq \eta_3 \Delta_{uv}^k[t], \forall v:(v,u)\in\epsilon, \qquad (48)$$

for $0 < \eta_2, \eta_3 < 1$. Exchanging v and u (48) becomes $$\phi_u[t] - \mu_{uv}^k(q_u^k[t] - q_v^k[t+1]) \geq \eta_3 \Delta_{uv}^k[t], \forall v:(v,u)\in\epsilon. \qquad (49)$$

From (46), (47) and (49), (by adding them together) the following results $$\phi_u[t+1] - \mu_{uv}^k(q_u^k[t+1] - q_v^k[t+1]) \geq (\eta_1 + \eta_2 + \eta_3 - 2)\Delta_{uv}^k[t] \forall v:(u,v)\in\epsilon, \qquad (50)$$

which requires that $$\eta_1 + eta_2 + \eta_3 > 2, \qquad (51)$$

to guarantee that the left-hand side of (36) is positive.

For the flow controller of commodity k, the following is imposed $$\theta^k[t+1] - \lambda^k(w_k - q_s^k[t] + q_d^k[t]) \geq \eta_1 \Delta^k \qquad (52)$$

where $$\Delta^k[t] := \theta^k[t+1] - \lambda^k(w_k - q_s^k[t] + q_d^k[t]),$$

and for the source and sink of commodity k, it is assumed $$\theta^k[t] - \lambda^k(w_k - q_s^k[t+1] + q_d^k[t]) \geq \eta_1 \Delta^k[t], \qquad (53)$$

and $$\theta^k[t] - \lambda^k(w_k - q_s^k[t+1] + q_d^k[t]) \geq \eta_1 \Delta^k[t]. \qquad (54)$$

Similarly (51) results.

Numerical results show that if $\gamma_u$ and $\gamma^k$ are not allowed to keep decreasing, the solution is not converging to anywhere. In fact, the decreasing γ is the driving force for the objective value going towards the optimum of the original problem.

First consider $\gamma_u$. A $\phi_u[t+1]$ can be computed such that $0 < \delta_u[t+1] \leq 1$, but meanwhile (46) needs to be satisfied. Note that $\gamma^k[t]$ satisfies $$\frac{1}{\gamma_u[t]} = \frac{1}{\theta_u[t]} + \sum_{v:(u,v)\in\epsilon}\sum_{k\in\mathcal{K}} \frac{1}{\theta_u[t] - \mu_{uv}^k(q_u^k[t-1] - q_v^k[t-1])} \quad (55)$$

With (46), (47) and (49), the following results $$\frac{1}{\theta_u[t] - \mu_{uv}^k \begin{pmatrix} q_u^k[t-1] - \\ q_v^k[t-1] \end{pmatrix}} \leq \frac{1}{(\eta_1 + \eta_2 + \eta_3 - 2)} \cdot \frac{1}{\theta_u[t+1] - \mu_{uv}^k(q_u^k[t] - q_v^k[t])}, \quad (56)$$

i.e., $$\gamma_u[t+1] \geq (\eta_1+\eta_2+\eta_3-2)\gamma_u[t], \quad (57)$$

which gives the maximum rate of $\gamma_u$ decreasing. Similarly:

$$\gamma^k[t+1] \leq (\eta_1+\eta_2+\eta_3-2)\gamma_u[t]. \quad (58)$$

Adding more constraints:

$$\phi_u[t] - \mu_{uv}^k(q_u^k[t+1] - q_v^k[t]) \leq \zeta_2 \Delta_{uv}^k[t], \forall v:(u,v)\in\epsilon, \quad (59)$$

and $$\phi_u[t] - \mu_{uv}^k(q_u^k[t] - q_v^k[t+1]) \leq \zeta_3 \Delta_{uv}^k[t] \forall v:(v,u)\in\epsilon. \quad (60)$$

for $\zeta_2, \zeta_3 > 1$. Adding (59) and (60) the following results $$\phi_u[t] - \mu_{uv}^k(q_u^k[t+1] - q_v^k[t+1]) \leq (\zeta_2 + \zeta_3 - 1)\Delta_{uv}^k[t].$$

Let $z := \phi_u[t+1] - \phi_u[t]$ and $$e_{uv}^k := \phi_u[t+1] - \mu_{uv}^k(q_u^k[t+1] - q_v^k[t+1]) = z + \Delta_{uv}^k,$$

The following results:

$$\Delta_{uv}^k[t+1] - z \leq (\zeta_2+\zeta_3-1)e_{uv}^k + (\zeta_2+\zeta_3-2)(-z).$$

or $$\Delta_{uv}^k[t+1] \leq (\zeta_2+\zeta_3-1)e_{uv}^k + (\zeta_2+\zeta_3-2)(-z).$$

Note that from (46) means $$e_{uv}^k \geq \eta_1 \Delta_{uv}^k = \eta_1(e_{uv}^k - z)$$

or equivalently, $$-z \leq \left(\frac{1}{\eta_1} - 1\right)e_{uv}^k.$$

Since $\zeta_2, \zeta_3 > 1$, the following results $$\Delta_{uv}^k[t+1] \leq \left[(\zeta_2+\zeta_3-1) + (\zeta_2+\zeta_3-2)\left(\frac{1}{\eta_1}-1\right)\right]e_{uv}^k = \left[\frac{\zeta_2+\zeta_3-2}{\eta_1}+1\right]e_{uv}^k.$$

Note that $$\frac{1}{\gamma_u[t+1]} = \frac{1}{\theta_u[t+1]} + \sum_{v:(u,v)\in\epsilon}\sum_{k\in\mathcal{K}}\frac{1}{e_{uv}^k}$$

and let $$\frac{1}{\tilde{\gamma}_u[t+1]} := \frac{1}{\theta_u[t+1]} - \sum_{v:(u,v)\in\epsilon}\sum_{k\in\mathcal{K}}\frac{1}{\Delta_{uv}^k[t+1]},$$

the following finally results, $$\tilde{\gamma}_u[t+1] \leq \left[\frac{\zeta_2+\zeta_3-2}{\eta_1}+1\right]\gamma_u[t+1].$$

In other words, the new $\gamma_u$ could get $(\zeta_2+\zeta_3+\eta_1-2)/\eta_1$ times greater in the worst case. This quantity is greater than one. It is close to one if $\zeta_2$, $\zeta_3$ and $\eta_1$ are all close to one. Now, since $\gamma_u[t+2] \leq \gamma_u[t+1]$ is required, the value of $\phi_u[t+1]$ has to be changed to achieve this objective. However, it must be guaranteed that after decreasing, all denominators are greater than $\eta_1$ portion of the original value. But note by (49), it has to be confirmed that $$\frac{\zeta_2+\zeta_3+\eta_1-2}{\eta_1} \leq \frac{1}{\eta_1}$$

or in other words, $$\zeta_2+\zeta_3 \leq 1+\eta_1$$

Figure 9:
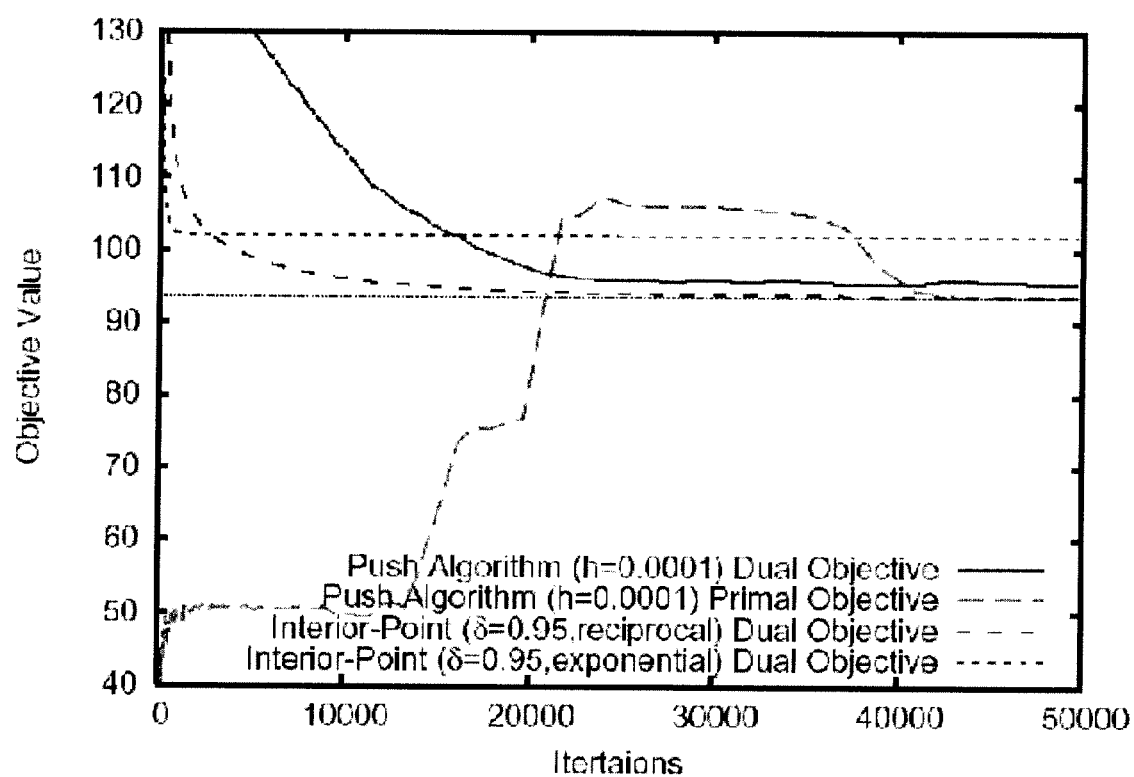
FIG. 9 is a graph depicting convergence performance for methods operating in accordance with the invention where the primal dual controller operates with and without an interior-point method.

FIG. 9 is a chart summarizing convergence performance of a primal dual controller operating in accordance with the invention showing further improvement in convergence performance with adoption of an interior-point method implemented in accordance with further embodiments of the invention.

Figure 10:
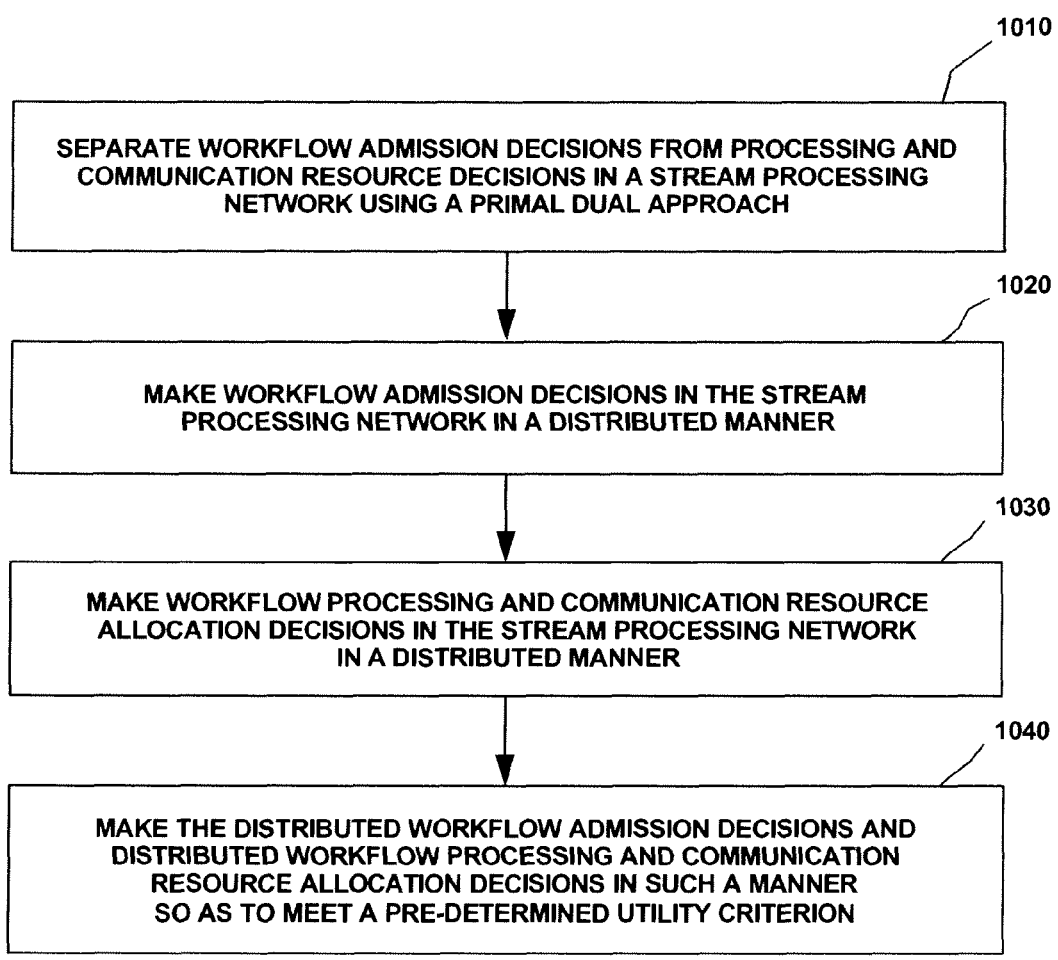
FIG. 10 is a flowchart summarizing a method operating in accordance with the invention.

FIG. 10 is a flowchart summarizing a method operating in accordance with the invention. At step 1010, workflow admission decisions are separated from processing and communication resource allocation decisions in a stream processing network operating on a plurality of workflows using a primal-dual approach. Next, at step 1020, the workflow admission decisions are made in the stream processing network in a distributed manner. Then, at step 1030, processing and communication resource allocation decisions are made in the stream processing network in a distributed manner. Next, at step 1040, the distributed workflow admission decisions and distributed workflow processing and communication resource allocation decisions are made in such a manner so as to meet a pre-determined utility criterion.

In a variant of the method of the invention depicted in FIG. 10, the pre-determined utility criterion comprises substantially maximizing information delivered by the stream processing network.

In another variant of the method of the invention depicted in FIG. 10, making workflow admission decisions and workflow processing and communication resource allocation decisions further comprise sharing workflow congestion information locally among elements of the stream processing network; and iteratively making the workflow admission decisions and workflow processing and communication resource allocation decisions in dependence on the workflow congestion information so that a pre-determined criterion concerning a level of optimality represented by the workflow admission decisions and workflow processing and communication resource allocation decisions is achieved.

In a further variant of the method of the invention depicted in FIG. 10, making workflow admission decisions in the stream processing network in a distributed manner further comprises using a push-pull admission method at workflow sources nodes and workflow sink nodes to control workflow admission rates.

In yet another variant of the method of the invention depicted in FIG. 10, using a push-pull admission control method further comprises operating the push-pull method in an iterative manner; maintaining a virtual queue at each node of the stream processing network; and at each iteration where an amount of a particular workflow is injected at a source node of the stream processing network associated with the particular workflow, demanding a flow credit at a sink node associated with the particular workflow, where the flow credit is equal to the amount of the workflow injected at the source node.

In a still further variant of the method of the invention depicted in FIG. 10, making workflow admission decisions in the stream processing network in a distributed manner further comprises using a push admission method at workflow sources nodes of the stream processing network to control workflow.

In another variant of the method of the invention depicted in FIG. 10, making workflow admission decisions in the stream processing network in a distributed manner further comprises using a pull admission method at workflow sink nodes of the stream processing network to control workflow admission rates.

In a variant of the method of the invention depicted in FIG. 10 making workflow processing and communication resource allocation decisions in the stream processing network in a distributed manner further comprises at each processing node using a pressure-based method to make workflow processing and communication resource allocation decisions.

In another variant of the method of the invention depicted in FIG. 10 using a pressure-based method further comprises sharing workflow backlog information with neighboring processing nodes; and allocating processing and communication resources at the processing node to at least one workflow having a maximum value for a product represented by downstream pressure times processing rate, wherein the downstream pressure for the workflow is defined as the collective backlog for the workflow among the neighboring nodes.

In a further variant of the method of the invention depicted in FIG. 10 the stream processing network comprises a plurality of processing nodes, each of the processing nodes configured to perform processing operations on at least one of the plurality of workflows using a processing resource. In the further variant of the method making processing and communication resource allocation decisions further comprises: at each processing node: setting a price for processing a unit of each workflow presented to the processing node for processing purposes, the price set for processing a unit of each workflow collectively comprising workflow price information; generating workflow queue information for each workflow; exchanging workflow price information and workflow queue information for each workflow with neighbor processing nodes; using the workflow price information and workflow queue information generated by the node and neighboring nodes to determine a processing resource allocation for the node; applying the determined processing resource allocation to control processing operations for a period of time; and iteratively repeating setting a price; exchanging workflow price information; and applying the calculated processing resource allocation after the period of time has lapsed.

In yet another variant of the method depicted in FIG. 10 each node maintains a virtual queue for each workflow and wherein setting a price for each workflow presented to the processing node further comprises setting a price in dependence on the virtual queue for the workflow.

In a still further variant of the method of the invention depicted in FIG. 10 making workflow admission decisions and making workflow processing and communication resource allocation decisions further comprise iteratively making workflow admission decisions and iteratively making workflow processing and communication resource allocation decision and using an interior-point method to improve the speed of convergence of the iterative decision making processes.

In a variant of the method of the invention depicted in FIG. 10 iteratively making workflow admission decisions and processing and communication resource allocation decisions using an interior-point method further comprises using barrier functions to improve the speed of convergence during workflow admission decisions and processing and communication resource allocation decisions.

In another variant of the method of the invention depicted in FIG. 10 iteratively making workflow admission decisions and processing and communication resource allocation decisions in the stream processing network in a distributed manner using an interior-point method further comprises sharing workflow-related information among neighboring elements of the stream processing network.

In a further variant of the method of the invention depicted in FIG. 10 the workflow-related information concerns local workflow congestion information.

In yet another variant of the method of the invention depicted in FIG. 10 iteratively making processing and communication resource decisions in a distributed manner using an interior-point method further comprises at each iteration at a particular processing node calculating anticipated profitability for processing a particular workflow; a profit margin associated with processing the particular workflow; and a cost of processing the particular workflow; and sharing the anticipated profitability; profit margin and cost with neighboring nodes as workflow-related information.

In a still further variant of the method of the invention depicted in FIG. 10, iteratively making processing and communication resource allocation decisions in the stream processing network in a distributed manner using an interior-point method further comprises allocating the processing and communication resources of the stream processing network in such a way so that a pre-determined profitability criterion is met.

In a variant of the method of the invention depicted in FIG. 10 making workflow processing and communication resource allocation decisions in a distributed manner further comprises: representing the stream processing network as a first graph comprising source nodes, processing nodes and sink nodes, wherein the source nodes, processing nodes and sink nodes are connected by communications links; generating a second graph using the first graph, where communication links in the first graph are represented as communication resource nodes in the second graph, and wherein each processing node and communication resource node of the second graph has an associated processing resource and communication resource, respectively; and using the second graph to make workflow processing and communication resource allocation decisions in the stream processing network in a distributed manner.

One of ordinary skill in the art will understand that methods depicted and described herein can be embodied in a computer program storable in a tangible computer-readable memory medium. Instructions embodied in the tangible computer-readable memory medium perform the steps of the methods when executed. Tangible computer-readable memory media include, but are not limited to, hard drives, CD- or DVD ROM, flash memory storage devices or in a RAM memory of a computer system. Such computer-readable memory media tangibly embodying computer programs capable of performing operations in accordance with the methods of the invention comprise further embodiments of the invention.

Thus it is seen that the foregoing description has provided by way of exemplary and non-limiting examples a full and informative description of the best methods and apparatus presently contemplated by the inventors for distributed joint admission control and dynamic resource allocation in stream processing networks. One skilled in the art will appreciate that the various embodiments described herein can be practiced individually; in combination with one or more other embodiments described herein; or in combination with methods and apparatus differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

[1] D. J. Abadi, Y. Ahmad, M. Balazinska, U. C, etintemel, M. Cherniack, J. -H. Hwang, W. Lindner, A. Maskey, A. Rasin, E. Ryvkina, N. Tatbul, Y. Xing, and S. B. Zdonik. The design of the Borealis stream processing engine. Proc. of CIDR, 2005, pp. 277-289.

[2] B. Awerbuch and F. Leighton. A simple local-control approximation algorithm for multicommodity flow. FOCS '93, pp. 459-468.

[3] B. Babcock, S. Babu, M. Datar, and R. Motwani. Chain: Operator Scheduling for Memory Minimization in Data Stream Systems. Proc. of ACM SIGMOD '03, pp. 253-264.

[4] B. Babcock, M. Datar, and R. Motwani. Load Shedding for Aggregation Queries over Data Streams. Proc. of ICDE Conf., 2004.

[5] M. S. Bazaraa, J. J. Jarvis and H. D. Sherali. Linear Programming and Network Flows, John Wiley & Sons, 1977.

[6] J. A. Broberg, Z. Liu, C. H. Xia and L. Zhang. A Multicommodity Flow Model for Distributed Streaming Processing, Proc. of SIGMETRICS, 2006.

[7] L. Bui, A. Eryilmaz, R. Srikant, and X. Wu, "Joint asynchronous congestion control and distributed scheduling for multihop wireless networks," Proc. of INFOCOM, 2006.

[8] D. Carney, U. $C_i$, etintemel, A. Rasin, S. Zdonik, M. Cherniack, and M. Stonebraker. Operator scheduling in a data stream manager. Proc. of 29th VLDB Conf., 2003.

[9] S. Chandrasekaran and M. J. Franklin. Remembrance of streams past: Overload-sensitive management of archived streams. 30th VLDB, 2004.

[10] L. Chen, K. Reddy, and G. Agrawal. GATES: A grid-based middleware for processing distributed data streams. Proc. of HPDC, 2004.

[11] M. Cherniack, H. Balakrishnan, M. Balazinska, D. Carney, U. Cetintemel, Y. Xing, and S. Zdonik. "Scalable Distributed Stream Processing." Proc. of CIDR, 2003.

[12] Y. Chi, H. Wang, P. S. Yu, and R. R. Muntz. Loadstar: A load shedding scheme for classifying data streams. Proc. of SIAM Conf. on Data Mining, 2005.

[13] C. D. Cranor, T. Johnson, O. Spatscheck, and V. Shkapenyuk. Gigascope: A stream database for network applications. Proc. ACM SIGMOD, 2003.

[14] Maximum pressure policies in stochastic processing networks. Operations Research, 53 (2), 2005.

[15] B. Gibbons, B. Karp, Y. Ke, S. Nath, and S. Seshan. "IrisNet: An Architecture for a World-Wide Sensor Web". IEEE Pervasive Computing, 2(4), 2003.

[16] N. Jain, L. Amini, H. Andrade, R. King, Y. Park, P. Selo, C. Venkatramani, "Design, Implementation, and Evaluation of the Linear Road Benchmark on the Stream Processing Core." Proc. of SIGMOD, 2006, pp. 431-442.

[17] F. Kelly, A. Maulloo, and D. Tan, "Rate control in communication networks: shadow prices proportional fairness and stability," Journal of the Operational Research Society, 1998.

[18] H. Khalil. Nonlinear Systems. 3rd ed., Prentice Hall, Upper Saddle River, N.J., 2002.

[19] X. Lin and N. B. Shroff, "The impact of imperfect scheduling on crosslayer rate control in multihop wireless networks," Proc. of INFOCOM 2005.

[20] Motwani et al. Query processing, approximation, and resource management in a data stream management system. Proc. of CIDR, 2003.

[21] P. Pietzuch, J. Ledlie, J. Shneidman, M. Roussopoulos, M. Welsh, and M. Seltzer. Network-Aware Operator Placement for Stream-Processing Systems. ICDE 2006.

[22] R. Srikant. The Mathematics of Internet Congestion Control. Birkhauser, Boston, Mass., 2004.

[23] U. Srivastava, K. Munagala and J. Widom, Operator placement for in-network stream query processing. Proc. of PODS, pp. 250-258, 2005.

[24] A. Stolyar. Maximizing queueing network utility subject to stability: greedy primal-dual algorithm. Queueing Systems: Theory and Applications, 50(4): 401-457, 2005.

[25] L. Tassiulas and A. Ephremides, Stability properties of constrained queueing systems and scheduling for maximum throughput in multihop radio networks, IEEE Transactions on Automatic Control, 37 (12): 1936-1949, 1992.

[26] N. Tatbul, U. $C_i$, etintemel, S. Zdonik, M. Cherniack, and M. Stonebraker. Load Shedding in a Data Stream Manager. Proc. of 29th VLDB Conf., pp. 309-320, 2003.

[27] Y. C. Tu, S. Liu, S. Prabhakar, and B. Yao. Load shedding in stream databases: a control-based approach. Proc. of 32th VLDB, pp. 787-798, 2006.

[28] S. Viglas and J. Naughton. Rate-Based Query Optimization for Streaming Information Sources. Proc. of SIGMOD Conf., pp. 37-48, 2002.

[29] L. Xiao, M. Johansson, and S. Boyd, Simultaneous routing and resource allocation via dual decomposition, IEEE Trans. on Comm., 52(7):1136-1144, 2004.

We claim:

1. A processing node configured to operate in a stream processing network, the processing node comprising:
    communication links configured to be coupled to the stream processing network and to communicate with other elements of the stream processing network;
    at least one memory configured to store at least one computer program, the computer program configured to perform distributed processing and communication resource allocation control as part of a primal dual controller implemented in the stream processing network, the at least one memory further configured to store workflow and workflow-related information; and
    at least one processing apparatus coupled to the communication links and the at least one memory, the processing apparatus configured to execute the at least one computer program and to perform processing operations on workflows received by the processing node, wherein when the at least one program is executed the processing node is configured to receive workflows presented for processing purposes; to maintain a queue for each workflow presented for processing purposes; to generate workflow-related information concerning the queue for each workflow; to transmit the workflow-related information to local elements of the stream processing network; to receive workflow-related information from the local elements of the stream processing network; and to allocate processing capacity of the processing node to at least one workflow in dependence on the workflow-related information generated by the processing node and received from local elements of the stream processing network.

2. The processing node of claim 1 where the processing node is further configured to operate as source node for workflow admission and wherein when the at least one computer program is executed by the processing apparatus the processing node is further configured to make workflow admission decisions.

* * * * *